US010860838B1

(12) United States Patent
Elahie et al.

(10) Patent No.: US 10,860,838 B1
(45) Date of Patent: Dec. 8, 2020

(54) UNIVERSAL FACIAL EXPRESSION TRANSLATION AND CHARACTER RENDERING SYSTEM

(71) Applicant: Electronic Arts Inc., Redwood City, CA (US)

(72) Inventors: Dwayne Lance Elahie, Pierrefonds (CA); Benjamin Andrew L Wronsky, Orlando, FL (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 15/872,891

(22) Filed: Jan. 16, 2018

(51) Int. Cl.
*G06T 15/00* (2011.01)
*G06K 9/00* (2006.01)
(Continued)

(52) U.S. Cl.
CPC ..... *G06K 9/00281* (2013.01); *G06K 9/00248* (2013.01); *G06K 9/00302* (2013.01); *G06K 9/4604* (2013.01); *G06T 7/60* (2013.01)

(58) Field of Classification Search
CPC ............. G06T 13/40; G06K 9/00268; G06K 9/00228; H04N 7/147; H04N 7/157
(Continued)

(56) References Cited

U.S. PATENT DOCUMENTS 5,274,801 A 12/1993 Gordon
5,548,798 A 8/1996 King
(Continued)

FOREIGN PATENT DOCUMENTS

CN 102509272 A 6/2012
CN 103546736 A 1/2014
(Continued)

OTHER PUBLICATIONS

Blanz V, Vetter T. A morphable model for the synthesis of 3D faces. InProceedings of the 26th annual conference on Computer graphics and interactive techniques Jul. 1, 1999 (pp. 187-194). ACM Press/ Addison-Wesley Publishing Co.*
(Continued)

*Primary Examiner* — Phu K Nguyen
(74) *Attorney, Agent, or Firm* — Knobbe, Martens, Olson & Bear, LLP

(57) ABSTRACT

Systems and methods for universal facial expression translation and character rendering. An example method includes obtaining a three-dimensional face model of a face of a virtual character. The three-dimensional face model is presented in a user interface, with facial characteristics of the three-dimensional face model adjustable in the user interface. Definitions of facial shapes of the virtual character are obtained, with each facial shape being associated with a facial shape identifier. A facial shape identifier indicates a type of adjustment of facial characteristics. A facial shape represents the three-dimensional face model of the virtual character with facial characteristics according to associated facial shape identifiers. The facial shapes are stored in a database as being associated with the character. User input specifying one or more facial shape identifiers is received. The three-dimensional face model is rendered with facial characteristics adjusted according to the one or more specified facial shape identifiers.

20 Claims, 13 Drawing Sheets

(51) Int. Cl.
*G06T 7/60* (2017.01)
*G06K 9/46* (2006.01)

(58) Field of Classification Search
USPC .................................................... 345/418
See application file for complete search history.

(56) References Cited

U.S. PATENT DOCUMENTS

| | | | |
|---|---|---|---|
| 5,982,389 A | 11/1999 | Guenter et al. | |
| 5,999,195 A | 12/1999 | Santangeli | |
| 6,064,808 A | 5/2000 | Kapur et al. | |
| 6,088,040 A * | 7/2000 | Oda | G06T 13/80 345/441 |
| 6,253,193 B1 | 6/2001 | Ginter et al. | |
| 6,556,196 B1 * | 4/2003 | Blanz | G06K 9/00275 345/419 |
| 6,961,060 B1 | 11/2005 | Mochizuki et al. | |
| 7,006,090 B2 | 2/2006 | Mittring | |
| 7,403,202 B1 | 7/2008 | Nash | |
| 7,415,152 B2 * | 8/2008 | Jiang | G06K 9/00288 345/473 |
| 8,100,770 B2 | 1/2012 | Yamazaki et al. | |
| 8,142,282 B2 | 3/2012 | Canessa et al. | |
| 8,154,544 B1 | 4/2012 | Cameron et al. | |
| 8,207,971 B1 * | 6/2012 | Koperwas | G06T 13/40 345/473 |
| 8,267,764 B1 | 9/2012 | Aoki et al. | |
| 8,281,281 B1 | 10/2012 | Smyrl et al. | |
| 8,395,626 B2 | 3/2013 | Millman | |
| 8,398,476 B1 | 3/2013 | Sidhu et al. | |
| 8,406,528 B1 | 3/2013 | Hatwich | |
| 8,540,560 B2 | 9/2013 | Crowley et al. | |
| 8,599,206 B2 | 12/2013 | Hodgins et al. | |
| 8,624,904 B1 * | 1/2014 | Koperwas | G06T 13/40 345/473 |
| 8,860,732 B2 | 10/2014 | Popovic et al. | |
| 8,914,251 B2 | 12/2014 | Ohta | |
| 9,117,134 B1 | 8/2015 | Geiss et al. | |
| 9,256,973 B2 * | 2/2016 | Koperwas | G06T 13/40 |
| 9,317,954 B2 * | 4/2016 | Li | G06T 7/251 |
| 9,483,860 B2 * | 11/2016 | Hwang | G06T 13/40 |
| 9,616,329 B2 | 4/2017 | Szufnara et al. | |
| 9,741,146 B1 | 8/2017 | Nishimura | |
| 9,811,716 B2 * | 11/2017 | Kim | G06K 9/00208 |
| 9,826,898 B1 | 11/2017 | Jin et al. | |
| 9,984,658 B2 | 5/2018 | Bonnier et al. | |
| 9,990,754 B1 | 6/2018 | Waterson et al. | |
| 10,022,628 B1 | 7/2018 | Matsumiya et al. | |
| 10,096,133 B1 | 10/2018 | Andreev | |
| 10,118,097 B2 | 11/2018 | Stevens | |
| 10,198,845 B1 * | 2/2019 | Bhat | G06T 13/40 |
| 10,388,053 B1 | 8/2019 | Carter, Jr. et al. | |
| 10,403,018 B1 | 9/2019 | Worsham | |
| 10,535,174 B1 | 1/2020 | Rigiroli et al. | |
| 2002/0054054 A1 | 5/2002 | Sanbe | |
| 2002/0180739 A1 | 12/2002 | Reynolds et al. | |
| 2003/0038818 A1 | 2/2003 | Tidwell | |
| 2004/0227760 A1 | 11/2004 | Anderson et al. | |
| 2004/0227761 A1 | 11/2004 | Anderson et al. | |
| 2005/0237550 A1 | 10/2005 | Hu | |
| 2006/0036514 A1 | 2/2006 | Steelberg et al. | |
| 2006/0149516 A1 | 7/2006 | Bond et al. | |
| 2006/0262114 A1 | 11/2006 | Leprevost | |
| 2007/0085851 A1 | 4/2007 | Muller et al. | |
| 2007/0097125 A1 | 5/2007 | Xie et al. | |
| 2008/0049015 A1 | 2/2008 | Elmieh et al. | |
| 2008/0111831 A1 | 5/2008 | Son et al. | |
| 2008/0152218 A1 | 6/2008 | Okada | |
| 2008/0268961 A1 | 10/2008 | Brook | |
| 2008/0316202 A1 | 12/2008 | Zhou et al. | |
| 2009/0066700 A1 | 3/2009 | Harding et al. | |
| 2009/0315839 A1 | 12/2009 | Wilson et al. | |
| 2010/0134501 A1 | 6/2010 | Lowe et al. | |
| 2010/0251185 A1 | 9/2010 | Pattenden | |
| 2010/0277497 A1 | 11/2010 | Dong et al. | |
| 2011/0012903 A1 | 1/2011 | Girard | |
| 2011/0074807 A1 | 3/2011 | Inada et al. | |
| 2011/0086702 A1 | 4/2011 | Borst et al. | |
| 2011/0119332 A1 | 5/2011 | Marshall et al. | |
| 2011/0128292 A1 | 6/2011 | Ghyme et al. | |
| 2011/0164831 A1 | 7/2011 | Van Reeth et al. | |
| 2011/0187731 A1 | 8/2011 | Tsuchida | |
| 2011/0269540 A1 | 11/2011 | Gillo et al. | |
| 2011/0292055 A1 | 12/2011 | Hodgins et al. | |
| 2012/0083330 A1 | 4/2012 | Ocko | |
| 2012/0115580 A1 | 5/2012 | Hornik et al. | |
| 2012/0220376 A1 | 8/2012 | Takayama et al. | |
| 2012/0244941 A1 | 9/2012 | Ostergren et al. | |
| 2012/0303343 A1 | 11/2012 | Sugiyama et al. | |
| 2012/0313931 A1 | 12/2012 | Matsuike et al. | |
| 2013/0050464 A1 | 2/2013 | Kang | |
| 2013/0063555 A1 | 3/2013 | Matsumoto et al. | |
| 2013/0120439 A1 | 5/2013 | Harris et al. | |
| 2013/0121618 A1 | 5/2013 | Yadav | |
| 2013/0222433 A1 | 8/2013 | Chapman et al. | |
| 2013/0235045 A1 | 9/2013 | Corazza et al. | |
| 2013/0263027 A1 | 10/2013 | Petschnigg et al. | |
| 2013/0311885 A1 | 11/2013 | Wang et al. | |
| 2014/0002463 A1 | 1/2014 | Kautzman et al. | |
| 2014/0198106 A1 | 7/2014 | Sumner et al. | |
| 2014/0198107 A1 | 7/2014 | Thomaszewski et al. | |
| 2014/0327694 A1 | 11/2014 | Cao et al. | |
| 2015/0113370 A1 | 4/2015 | Flider | |
| 2015/0126277 A1 | 5/2015 | Aoyagi | |
| 2015/0187113 A1 | 7/2015 | Rubin et al. | |
| 2015/0235351 A1 | 8/2015 | Mirbach et al. | |
| 2015/0243326 A1 | 8/2015 | Pacurariu et al. | |
| 2015/0381925 A1 * | 12/2015 | Varanasi | H04N 5/91 382/190 |
| 2016/0026926 A1 | 1/2016 | Yeung et al. | |
| 2016/0071470 A1 | 3/2016 | Kim et al. | |
| 2016/0217723 A1 | 7/2016 | Kim et al. | |
| 2016/0307369 A1 | 10/2016 | Freedman et al. | |
| 2016/0314617 A1 | 10/2016 | Forster et al. | |
| 2016/0354693 A1 | 12/2016 | Yan et al. | |
| 2017/0301310 A1 | 10/2017 | Bonnier et al. | |
| 2017/0301316 A1 | 10/2017 | Farell | |
| 2018/0043257 A1 | 2/2018 | Stevens | |
| 2018/0211102 A1 * | 7/2018 | Alsmadi | G06K 9/00315 |
| 2019/0139264 A1 | 5/2019 | Andreev | |

FOREIGN PATENT DOCUMENTS

| | | |
|---|---|---|
| CN | 105405380 A | 3/2016 |
| CN | 105825778 A | 8/2016 |

OTHER PUBLICATIONS

Hu Gousheng, Face Analysis using 3D Morphable Models, Ph.D. Thesis, University of Surrey, Apr. 2015, pp. 1-112.*

Hu G, Chan Ch, Yan F, Christmas W, Kittler J. Robust face recognition by an albedo based 3D morphable model. InBiometrics (IJCB), 2014 IEEE International Joint Conference on Sep. 29, 2014 (pp. 1-8). IEEE.*

Blanz, V., Basso, C., Poggio, T. and Vetter, T., Sep. 2003, Reanimating faces in images and video. In Computer graphics forum (vol. 22, No. 3, pp. 641-650). Oxford, UK: Blackwell Publishing, Inc.*

Anagnostopoulos et al., "Intelligent modification for the daltonization process", International Conference on Computer Vision Published in 2007 by Applied Computer Science Group of digitized paintings.

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 pages.

(56) References Cited

OTHER PUBLICATIONS

Belytschko et al., Nonlinear Finite Elements for Continua and Structures, Second Edition, Wiley (Jan. 2014), 727 pages (uploaded in 3 parts).
Chao et al., "A Simple Geometric Model for Elastic Deformations", 2010, 6 pgs.
Cook et al., Concepts and Applications of Finite Element Analysis, 1989, Sections 6-11 through 6-14.
Cournoyer et al., "Massive Crowd on Assassin's Creed Unity: AI Recycling," Mar. 2, 2015, 55 pages.
Dick et al., "A Hexahedral Multigrid Approach for Simulating Cuts in Deformable Objects", IEEE Transactions on Visualization and Computer Graphics, vol. X, No. X, Jul. 2010, 16 pgs.
Diziol et al., "Robust Real-Time Deformation of Incompressible Surface Meshes", to appear in Proceedings of the 2011 ACM SIGGRAPH/Eurographics Symposium on Computer Animation (2011), 10 pgs.
Dudash, Bryan. "Skinned instancing." NVidia white paper(2007).
Fikkan, Eirik. Incremental loading of terrain textures. MS thesis. Institutt for datateknikk og informasjonsvitenskap, 2013.
Geijtenbeek, T. et al., "Interactive Character Animation using Simulated Physics", Games and Virtual Worlds, Utrecht University, The Netherlands, The Eurographics Association 2011, 23 pgs.
Georgii et al., "Corotated Finite Elements Made Fast and Stable", Workshop in Virtual Reality Interaction and Physical Simulation VRIPHYS (2008), 9 pgs.
Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.
Han et al., "On-line Real-time Physics-based Predictive Motion Control with Balance Recovery," Eurographics, vol. 33(2), 2014, 10 pages.
Hernandez, Benjamin, et al. "Simulating and visualizing real-time crowds on GPU clusters." Computación y Sistemas 18.4 (2014): 651-664.
Irving et al., "Invertible Finite Elements for Robust Simulation of Large Deformation", Eurographics/ACM SIGGRAPH Symposium on Computer Animation (2004), 11 pgs.
Kaufmann et al., "Flexible Simulation of Deformable Models Using Discontinuous Galerkin FEM", Oct. 1, 2008, 20 pgs.
Kavan et al., "Skinning with Dual Quaternions", 2007, 8 pgs.
Kim et al., "Long Range Attachments—A Method to Simulate Inextensible Clothing in Computer Games", Eurographics/ACM SIGGRAPH Symposium on Computer Animation (2012), 6 pgs.
Klein, Joseph. Rendering Textures Up Close in a 3D Environment Using Adaptive Micro-Texturing. Diss. Mills College, 2012.
Komura et al., "Animating reactive motion using momentum-based inverse kinematics," Computer Animation and Virtual Worlds, vol. 16, pp. 213-223, 2005, 11 pages.
Lee, Y. et al., "Motion Fields for Interactive Character Animation", University of Washington, Bungie, Adobe Systems, 8 pgs, obtained Mar. 20, 2015.
Levine, S. et al., "Continuous Character Control with Low-Dimensional Embeddings", Stanford University, University of Washington, 10 pgs, obtained Mar. 20, 2015.
Macklin et al., "Position Based Fluids", to appear in ACM TOG 32(4), 2013, 5 pgs.
Mcadams et al., "Efficient Elasticity for Character Skinning with Contact and Collisions", 2011, 11 pgs.
McDonnell, Rachel, et al. "Clone attack! perception of crowd variety." ACM Transactions on Graphics (TOG). vol. 27. No. 3. ACM, 2008.
Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Musse, Soraia Raupp, and Daniel Thalmann. "Hierarchical model for real time simulation of virtual human crowds." IEEE Transactions on Visualization and Computer Graphics 7.2 (2001): 152-164.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Ruiz, Sergio, et al. "Reducing memory requirements for diverse animated crowds." Proceedings of Motion on Games. ACM, 2013.
Rungjiratananon et al., "Elastic Rod Simulation by Chain Shape Matching withTwisting Effect" SIGGRAPH Asia 2010, Seoul, South Korea, Decemer 15-18, 2010, ISBN 978-1-4503-0439-9/10/0012, 2 pgs.
Seo et al., "Compression and Direct Manipulation of Complex Blendshape Models", Dec. 2011, in 10 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Stomakhin et al., "Energetically Consistent Invertible Elasticity", Eurographics/ACM SIGRAPH Symposium on Computer Animation (2012), 9 pgs.
Thalmann, Daniel, and Soraia Raupp Musse. "Crowd rendering." Crowd Simulation. Springer London, 2013. 195-227.
Thalmann, Daniel, and Soraia Raupp Musse. "Modeling of Populations." Crowd Simulation. Springer London, 2013. 31-80.
Treuille, A. et al., "Near-optimal Character Animation with Continuous Control", University of Washington, 2007, 7 pgs.
Ulicny, Branislav, and Daniel Thalmann. "Crowd simulation for interactive virtual environments and VR training systems." Computer Animation and Simulation 2001 (2001 ): 163-170.
Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.
Vigueras, Guillermo, et al. "A distributed visualization system for crowd simulations." Integrated Computer-Aided Engineering 18.4 (2011 ): 349-363.
Wu et al., "Goal-Directed Stepping with Momentum Control," Eurographics/ ACM SIGGRAPH Symposium on Computer Animation, 2010, 6 pages.

* cited by examiner

Facial Shape A for Facial Shape Identifier A

Facial Shape B for Facial Shape Identifier B

Corrective Shape

Facial Shape A + Facial Shape B + Corrective Shape

UNIVERSAL FACIAL EXPRESSION TRANSLATION AND CHARACTER RENDERING SYSTEM

FIELD OF THE DISCLOSURE

The described technology generally relates to computer technology and, more specifically, to animation.

BACKGROUND

Video games include rich, lifelike, characters that are created to follow complex scripts, and are placed in video games via computationally expensive animation processes. A character may be animated to emote, and in so doing the character's face may express disparate feelings while providing dialogue. For example, a character may express feelings of happiness, apprehension, fear, and so on. Generally, video game modelers are required to manipulate a 3D model of a character's face to arrive at each emotion. As an example, a video game modeler may modify the character's face to appear happy. This modification may stem from the video game modeler's utilization of software to create a 3D model of the character's face, and then adjust the 3D model until it conforms to the emotion required. However, each character's range of facial expressions are required to be modeled separately. That is, a video game modeler will have to uniquely adjust a 3D model of each character's face until the face arrives at each of defined facial expression. The process can result in a large amount of work which is not transferable between characters.

Additionally, once each character's face is modeled, the modeled expressions are not easily adjustable to indicate variations on the expression. For example, a modeler can create a happy face for a character, and one or more variations that express slightly different emotions that are related to being happy (e.g., a bemused look). When the character is being animated, a video game animator may only be able to select from the happy face, or pre-configured variations, when animating a scene. Thus, the character's facial expressions lack granularity seen in real humans as the same faces are being repeated.

SUMMARY OF THE DISCLOSURE

Described herein are systems and methods for a universal language, or set of rules, describing facial expressions for animated characters. While reference is made herein to video games, the techniques described can apply to any scenario in which animated characters are used, such as films, TV shows, and so on. As will be described, fundamental facial shapes can be defined for a character, and complex facial expressions generated based on combinations of these facial shapes. Each fundamental facial shape can be an adjustment of a three-dimensional face model of a character from a neutral expression of the character. Additionally, each fundamental facial shape may be associated with a particular facial shape identifier that indicates adjustment of particular facial characteristics (e.g., particular facial muscles or features). An animator can simply specify combinations of these facial shape identifiers to cause generation of a facial expression (e.g., an adjusted three-dimensional face model representative of the facial expression).

Thus, the facial shape identifiers can be utilized as a universal language to describe facial expressions, and animators can rapidly create facial expressions for arbitrary characters via combinations of facial shape identifiers. An example standard utilized to define these fundamental facial shapes is the Facial Action Coding System (FACS), which defines a set of Action Units each associated with a fundamental shape. Combinations of these Action Units can generate complex, subtle, emotions that are not possible in prior systems. While other standards may be selected and fall within the scope of this disclosure, FACS is utilized as a universal language on which the techniques described herein are based.

As an example, an animator may desire a first type of smile for an animated scene, and utilizing a user interface described herein (e.g., with respect to FIGS. 7A-7B), can specify a first facial shape identifier indicating a contraction of the zygomaticus major. As another example, the animator may want a second type of smile, and may therefore combine the first facial shape identifier with a second facial shape identifier indicating contraction of the inferior part of the orbicularis oculi. In this way, the animator can easily generate complex emotions for a character.

As will be described in more detail below, the universal language described herein can be applied universally to any character. With respect to the example of the first type of smile above, an animator may similarly specify the first facial shape identifier for other characters. These other characters will then express the same first type of smile. Therefore, the techniques described herein enable an animator to rapidly specify emotions that each character is to express via combinations of facial shape identifiers. Additionally, while an animator can specify the first facial shape identifier for each character, the actual facial shape (e.g., 3D model of a face) that is generated for each character may be distinct. For example, when a first character smiles the angle of his/her mouth may be different from a second character. As will be described, these subtle variations may be informed via facial scans of actors, thus ensuring that different lifelike characters can be realistically animated. Therefore, each character may optionally have unique fundamental facial shape shapes that are combinable according to the universal language.

In this way, the techniques described herein allow animators to utilize a common set of identifiers for fundamental facial shapes (e.g., FACS Action Units) to create facial expressions for any character. In contrast to other example systems in which the animators may be required to uniquely sculpt 3D models of faces to create expressions as they animate a scene, an animator may instead rely on the common set of identifiers to generate subtle facial expressions. Thus, an animator may rely on known rules that define FACS, and the system can similarly follow rules associated with combining combinations of the fundamental shapes.

The systems and methods described herein therefore improve the functioning of the computer and address technological problems. In contrast to prior systems, which may rely on creation of unique facial expressions for a required scenario, the rules-based approach described herein allows animators to bring realistic uniformity to each character while providing emotional range which has not been possible. For example, prior systems may require a modeler to uniquely create a happy facial expression, a sad facial expression, and so on. However, any combination of these facial expressions, or a modification of a created facial expression, will require the modeler to create a unique additional facial expression. Therefore, a character will have only a small defined set of facial expressions which have been uniquely modeled. In contrast, the rules-based approach described herein utilizes fundamental facial shapes to create hundreds, thousands, and so on, different facial expressions. For example, an animator may augment a particular smile by specifying an additional facial shape identifier be added, and the 3D model of a character's face can be updated to include the additional facial shape (e.g., a slight narrowing of a nose, raising of an eyebrow, and so on). Additionally, since the rules-based approach relies on a common set of facial shape identifiers for the facial shapes, animators can rapidly specify combinations for any character. In this way, the animators can focus on defining emotions appropriate for a scene, instead of focusing on sculpting character faces for the scene.

Furthermore, since complex emotions can be generated from these fundamental facial shapes, less storage space may be required to animate scenes on a resulting video game. For example, a video game system executing the video game can generate a facial expression for a character based on a combination of the fundamental facial shapes. Due to the immense variations that are possible within the system described herein, a technique which relies on uniquely created facial expressions will have to store 3D models of each expression used in the video game. In contrast, only the fundamental shapes are required to be stored. Thus, for video games that utilize full, lifelike, emotions for its characters, the techniques described herein allow for reductions in storage space.

The rules-based approach additionally constrains processing power required to generate the large range of facial expressions that are enabled. As will be described below, rules can be utilized to inform the generation of a facial expression from a defined combination of fundamental facial shapes. For example, a particular combination may be additive, in that each facial shape in the combination may be combined to arrive at a resulting facial expression. As another example, a different combination may be complex, in that a combination will result in an incorrect facial expression. In this example, corrective shapes can be generated, and then combined with the facial shapes in the combination, to result in the intended facial expression. This rules-based approach therefore allows for limited processing of the fundamental facial shapes, while producing very natural facial expressions.

Accordingly, in various embodiments, large amounts of data are automatically and dynamically calculated interactively in response to user inputs, and the calculated data can be efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from universal facial expression. The detailed description and drawings are merely illustrative of the disclosure rather than limiting, the scope of the disclosure being defined by the appended claims and equivalents thereof.

In various embodiments, systems and/or computer systems are disclosed that comprise computer readable storage media having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising computer readable storage media are disclosed, wherein the computer readable storage media have program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated description herein are provided to illustrate specific embodiments of the disclosure and are not intended to be limiting.

DETAILED DESCRIPTION

Figure 1:
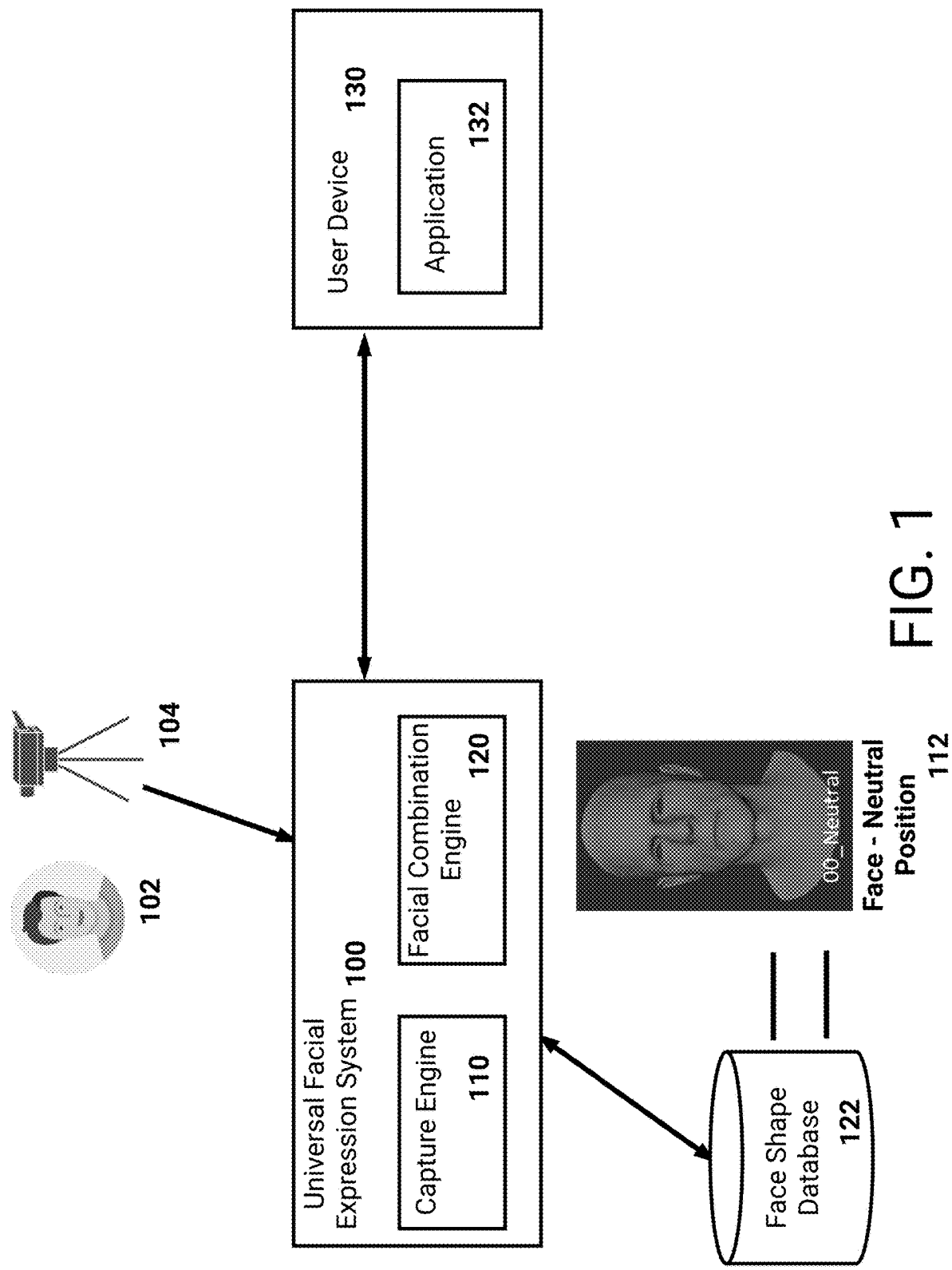
FIG. 1 illustrates a block diagram of an example universal facial expression system.

This specification describes schemes for utilizing universal languages to specify facial expressions for application to three-dimensional models of faces on different animated characters (e.g., animated characters in video games, films, and so on). For example, an animator can specify a particular smile according to a universal language, and different animated characters can automatically update to present the particular smile. As will be described, each animated character may have a distinct version of the specified smile. As an example, each animated character may have a unique neutral facial expression (e.g., resting face), such that the specified smile will be an adjustment from this unique neutral expression. As another example, each animated character may have unique facial features, such as unique spacing between eyes, mouth, eye brows, and so on. Therefore, adjustments to these facial features will result in lifelike, and unique looking, animated characters.

Additionally, this specification describes schemes for efficient creation of new faces for animated characters, and schemes to automatically enable these new faces to express disparate facial expressions using the universal language described herein. For example, features of the new faces can be correlated with features of existent faces, and the facial expressions of the new face can be a combination of one or more of the existent faces.

In order to facilitate an understanding of the systems and methods discussed herein, a number of terms are described below. The terms described below, as well as other terms used herein, should be construed broadly to include the provided definitions, the ordinary and customary meaning of the terms, and/or any other implied meaning for the respective terms.

As used herein, a three dimensional face model, also referred to as a three-dimensional facial model, and a three-dimensional model, can refer to a wire-frame mesh, or point-cloud, model of a face, with textures (e.g., blended textures) on the model representative of a face. For example, images of a person (e.g., an actor) may be obtained via a camera rig. These images can be utilized to generate a point-cloud of the person's face, in which points with location and depth information are connected via vertices. A modeler (e.g., a blend-shape artist) can modify the point-, cloud, blend textures, and so on, to generate a three-dimensional face model based on the person's face. As will be described below, the generated three-dimensional face model can represent a neutral face of the person. The face model can be divided into a plurality of sections or portions. Each section is associated with a facial shape identifier. The sections can be adjusted relative to the neutral face to conform to each of a multitude of facial expressions defined by the facial shape identifiers.

As used herein, a facial shape identifier can refer to an identifier associated with adjustment of one or more facial characteristics (e.g., facial muscles) from a neutral position of a face. A facial shape identifier can indicate a fundamental adjustment of a face, for example an adjustment of a corner of a mouth, a particular portion of the brow being raised, and so on. Each facial shape identifier may optionally represent a facial Action Unit in the Facial Action Coding System (FACS) described herein. Since each facial shape identifier can indicate a fundamental adjustment of a face, combinations of these facial shape identifiers can represent complex facial expressions.

As used herein, a facial shape can refer to a three-dimensional face model of a character that conforms to a particular facial shape identifier. As will be described below, a modeler (e.g., a blend shape artist) can obtain a three-dimensional model of a face of a character, and adjust the model from a neutral position to a position in conformance with each facial shape identifier. For example, a facial shape identifier may indicate an inner eye brow being raised. In this example, the modeler can cause an inner eye brow on a three-dimensional model of a character to be raised from the model's neutral position. The facial shape associated with the example facial shape identifier can therefore be defined for this character by the modeler. A definition, for example, can indicate the specific adjustments of the three-dimensional face model, or can represent the specific adjusted three-dimensional face model itself. In this way, the modeler can define facial shapes for multitudes of animated characters. Subsequently, a user (e.g., an animator) may specify a facial shape identifier for a particular animated character, and the associated facial shape can be presented.

Figure 7A:
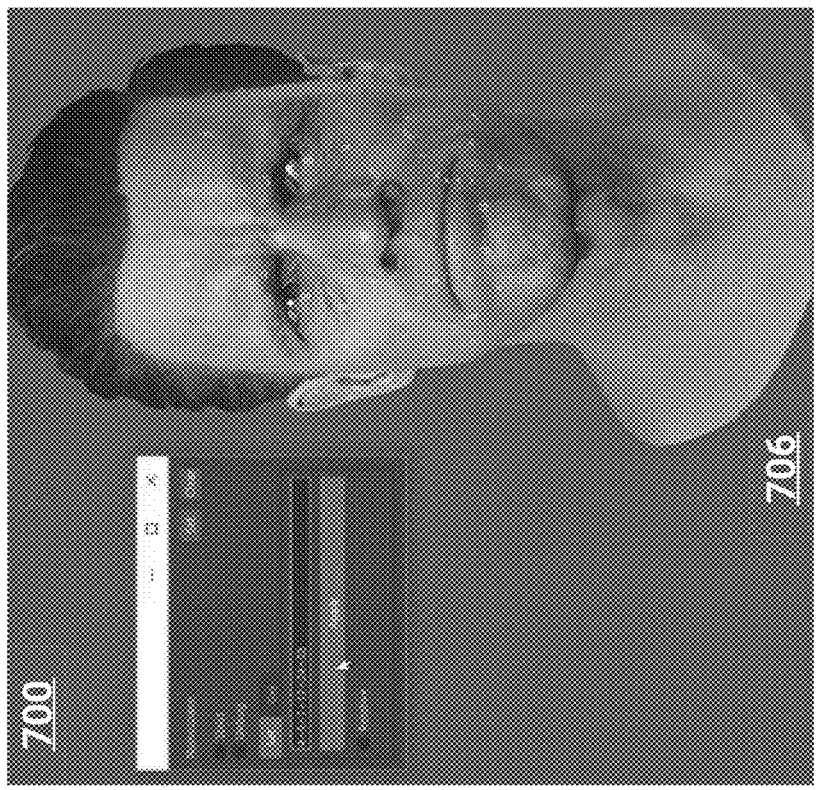
FIG. 7A illustrates an example user interface for generating facial expressions.

As used herein, a facial expression can refer to a combination of one or more facial shapes, which when combined can represent a realistic expression. For example, specific types of smiles (e.g., a Duchenne smile, a Pan Am smile, and so on) may include different combinations of facial shapes. A user (e.g., an animator) may indicate a combination of facial shape identifiers in a user interface (e.g., as illustrated in FIG. 7A), and a three-dimensional face model of a character may be updated to reflect the combination.

As used herein, an additive combination can refer to facial shapes that do not conflict when combined, such that a combination of facial shapes can be simply merged to arrive at a facial expression. For example, an additive combination may include a combination of a first facial shape in which a three-dimensional model's eye is raised and a second facial shape in which the model's mouth is raised. Since the associated muscle movements do not interact, these two example facial shapes can be combined to arrive at a facial expression.

As used herein, a complex combination can refer to facial shapes that conflict when combined, such that a combination of facial shapes cannot be simply merged to arrive at a facial expression. As will be described, corrective facial shapes (also referred to herein as corrective shapes) can be defined for a character, and a corrective facial shape can be utilized to arrive at an intended facial expression. For example, a corrective facial shape is illustrated in FIG. 2C. For a complex combination, an animator can specify two or more facial shape identifiers, and the associated facial shapes and any corrective facial shapes can be combined to arrive at a facial expression.

As used herein, a mutually exclusive combination can refer to facial shapes that are unable to be combined. For example, a first facial shape in which a three-dimensional model's mouth is raised cannot be combined with a three-dimensional model's mouth being lowered. As will be described, a user (e.g., an animator) that indicates a combination of facial shape identifiers which result in a mutually exclusive combination, can be presented with information indicating that the associated facial shapes cannot be combined.

As used herein in reference to user interactions with data displayed by a computing system, "user input" is a broad term that refers to any type of input provided by a user that is intended to be received and/or stored by the system, to cause an update to data that is displayed by the system, and/or to cause an update to the way that data is displayed by the system. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse.

As used herein, a data store can refer to any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

As used herein, a database can refer to any data structure (and/or combinations of multiple data structures) for storing and/or organizing data, including, but not limited to, relational databases (e.g., Oracle databases, mySQL databases, and so on), non-relational databases (e.g., NoSQL databases, and so on), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

This specification describes a system that enables generation of complex facial expressions on animated characters according to a universal facial expression language. For example, the universal facial expression language may be the Facial Action Coding System (FACS), and the system may generate facial expressions that conform to FACS. In this specification, a facial expression represents a three-dimensional model of a character's face (e.g., a video game character) which has defined facial characteristics. For example, an example facial expression may be a three-dimensional model of a face which has an inner brow raised and a wrinkled nose. As will be described, an animator can utilize the universal facial expression language to specify (1) the raised inner brow and (2) the wrinkled nose, and the system can generate the resulting facial expression. The animator can then cause importation of this facial expression into a video game, for example as a key-frame in a scene being animated. In this way, the animator can rapidly define facial expressions of the character for importation in the video game. As will be described below, the system can interpolate between the defined facial expressions, such that lifelike movement from a first facial expression to a second facial expression can be automatically animated.

To generate a facial expression for a character, an animator can specify facial shape identifiers that form the facial expression. A facial shape can refer to a 3D model of a character's face with defined facial characteristics, and one or more facial shapes may be combined to form a facial expression. For example, a facial shape may be a fundamental facial shape, which has a sole defined facial characteristic. Example facial characteristics can include, inner brow raised, outer brow raised, lip corner being pulled, tongue showing, mouth being stretched, position of a head, eye position, and so on. A facial shape identifier can represent an identifier associated with a defined facial characteristic. As described above, a combination of these facial shapes can form complex facial expressions, such as facial expressions representing nuanced emotions (e.g., fear, happiness, surprise, skepticism, and so on). In the parlance of FACS, a facial shape identifier may correspond with a facial Action Unit. With respect to the example facial expression defined above, the animator can specify a first facial shape identifier for (1) the raised inner brow, and a second facial shape identifier for (2) the wrinkled nose. For example, the animator can specify the FACS Action Units '1' and '9'. An example of a user interface for specifying facial shape identifiers is described below, with respect to FIGS. 7A-7B.

The facial shapes may be based on facial scans of an actor's face. As will be described, one or more cameras may capture images of an actor's face. Optionally, depth sensors (e.g., lidar, infrared points being projected onto the face, stereo cameras, and so on) may be utilized to obtain accurate depth information of the actor's face. While these images are being captured, the actor may be requested to make particular facial expressions and/or make minor movements of particular portions of his/her face. A minor movement may, as an example, correspond to a particular FACS Action Unit. The system can obtain the captured images and generate photogrammetric models of the actor's face (e.g., a point cloud of the actor's face, such as points connected via vertices).

A modeler, such as a blend shape artist, may utilize the photogrammetric model of the actor's face to generate a three-dimensional model that will be imported into a video game. This three-dimensional model can include textures for the actor's face, and preserve a portion of the vertices included in the point cloud. For example, the modeler can optimize the three-dimensional model for processing and storage constraints. To ensure that the actor's unique facial movements can be accurately reproduced, the generated three-dimensional model can represent a neutral position for the actor. Since all humans have unique neutral (e.g., resting) facial expressions, from which their other facial expressions stem from, the neutral position can be determined to enable lifelike facial expressions. Subsequently, the modeler can manipulate the three-dimensional models using the facial shape identifiers. For example, the modeler can manipulate the three-dimensional model in accordance with FACS Action Unit codes. The system can combine images captured of an actor making a face that illustrates a facial shape identifier. The modeler can adjust the neutral position to conform to the facial shape identifier. For example, if the facial shape corresponds to FACS Action Unit '6' (e.g., cheek raiser), the modeler can adjust the neutral position to have the three-dimensional model's cheek being raised.

Each facial shape associated with a facial shape identifier may be generated by the modeler, with the facial shape being generated based on the neutral position. As an example, a first neutral position of a first character (e.g., determined from a first actor) may include a mouth pointed slightly downwards. A facial shape associated with the mouth being raised upwards will therefore appear different than a facial shape defined based on a second neutral position of a second character for which a mouth is flat (e.g., determined from a second actor). These little variations serve to tie the facial shapes, and therefore resulting facial expressions, to realistic lifelike persons. With respect to the first neutral position, to ensure that the facial shape is accurately modeled, the modeler can define a range associated with an upward movement of the mouth (e.g., based on images obtained of the first actor). That is, the modeler can indicate a maximum height that the mouth can move upwards (e.g., the corners of the mouth). This maximum height may be less than the maximum height for the second neutral position of the second character. These facial shapes may then be stored in one or more databases.

An animator can specify a facial shape identifier and an intensity associated with the facial shape identifier. Upon specification, the system can access the database and obtain the associated facial shape. One or more rules may be utilized to adjust the facial shape according to the intensity, for example rigging of the facial shape may be automatically performed. The intensity of a facial shape identifier represents a degree to which defined facial characteristic(s) associated with the facial shape identifier are adjusted. As an example, an intensity of a mouth being raised upwards can range from the mouth being raised minimally upwards to the mouth being raised to the maximum height indicated by the modeler. In this way, an animator can reign in, or increase, particular facial characteristics to generate very accurate facial expressions.

While the above description focused on facial shapes being generated from images of an actor, as will be described below in FIG. 3 the system may also automatically generate facial shapes for an entirely new character based on the previously generated facial shapes. As an example, the system can obtain a three-dimensional face model of a new character, and based on analyzing the morphology of the three-dimensional model, can identify a closest character which had facial shapes previously generated for it. These facial shapes can then be utilized for this new character. For example, movement of the underlying wire-frame mesh, or point cloud, for a facial shape (e.g., rules for rigging the three-dimensional model) can be applied to the new character. Additionally, the system can determine two or more closest characters, and automatically combine facial shapes for the two or more closest characters to generate facial shapes for the new character. Therefore, the system may reduce a need for the complexities associated with generating facial shapes for each character.

The databases can store the facial shapes according to their respective facial shape identifiers, and further as being associated with a particular character. For example, the database can indicate that a first character has a particular set of facial shapes. An animator, such as a facial rigging animator, may utilize the database to enable generation of complex facial expressions. The universal facial expression language, such as FACS, can inform the generation of these complex facial expressions. For example, the animator can specify combinations of facial shape identifiers (e.g., as illustrated in FIG. 7A), and a resulting facial expression can be presented on a three-dimensional face model of a character.

Particular combinations of facial shape identifiers may be additive combinations, indicating that the associated facial shapes can be simply combined to arrive at a facial expression. For example, a first facial shape in which a mouth is being raised can be combined with a second facial shape in which is a nose is being wrinkled. If this combination were to be animated, the character's mouth would move upwards (e.g., over one or more frames of animation) while the character's nose would become wrinkled. Since these portions of the character's face moving do not conflict, they can be additively combined.

A different combination of facial shape identifiers may be a complex combination, indicating that the associated facial shapes cannot be simply additively combined. For example, a first facial shape in which an inner brow is being raised may not be additively combined with a second facial shape in which a brow lowerer is being lowered. Since the movement of the inner brow and brow lowerer may conflict, the combination can be defined as complex. As will be described below, with respect to FIGS. 2A-2D, a corrective facial shape may be required. For example, the corrective facial shape can be utilized to inform the proper facial expression intended by the combination of the first facial shape and second facial shape. Therefore, when animating this example complex combination, the system can utilize the first facial shape, second shape, and corrective shape associated with this complex combination, to render the animation.

Additionally, a particular combination of facial shape identifiers may be a mutually exclusive combination, indicating that the associated facial shapes cannot be combined. For example, a facial shape associated with a mouth being raised may not be able to be combined with a facial shape associated with a mouth being lowered. If an animator selects a combination of facial shapes that, when combined, are mutually exclusive, the system cam present warning information in a user interface being utilized by the animator. For example, the user interface 700 described below in FIG. 7A.

An animator can use this system to quickly define facial shape identifiers that are to be combined to arrive at a facial expression, for example in a key-frame. In subsequent key-frames, the animator can select different facial shape identifiers, or adjust an intensity of one or more of the facial shape identifiers. The system can enable the interpolation between each combination, allowing for an intuitive scheme for creating facial expressions. Additionally, since the facial shapes are defined according to facial shape identifiers associated with the facial shapes, the animator can quickly create facial expressions for any arbitrary character. That is, the animator is not required to perform any additional work for a new character. Instead, the animator can simply define combinations of facial shape identifiers and a resulting facial expression will be generated. Since these facial shape identifiers are known to the animator, the animator can obtain consistent facial expressions from any arbitrary character. The techniques described herein increase efficiency with respect to animating characters and also simplify the animation process, all while enabling more complex facial expressions than previously obtainable. The system can cause the defined facial expressions to be imported into a video game. A video game system may execute the video game, and utilizing the facial shapes for a character, generate facial expressions for real-time rendering in the video game according to the techniques described herein.

FIG. 1 illustrates a block diagram of an example universal facial expression system 100. The universal facial expression system 100 can be a system of one or more computers, one or more virtual machines executing on a system of one or more computers, and so on. As described above, the universal facial expression system 100 can obtain images captured of an actor's face, store three-dimensional models associated with disparate facial shapes, and generate complex facial expressions that are based on combinations of the facial shapes.

As illustrated, the universal facial expression system 100 is in communication with a user device 130 of a user (e.g., a modeler, an animator, and so on). The user device 130 can be a desktop computer system, a laptop, a tablet, a mobile device, a wearable computer, and so on. Optionally, the universal facial expression system 100 may be connected (e.g., a wireless or wired connection) to a display, and a user can directly utilize the universal facial expression system 100. Optionally, the universal facial expression system 100 may implement a web application which the user device 130 can access. That is, the user device 130 can present a web page or a user interface associated with an application 132 executing on the user device 130 (e.g., an 'app' obtained from an electronic application store, a web application, and so on). The universal facial expression system 100 can then provide information to the user device 130 for inclusion in the web page or application 132. For example, the user can provide user interactions, such as a combination of facial shape identifiers, to the user device 130, and the universal facial expression system 100 can receive these user interactions and generate an output associated with them (e.g., a resulting facial expression from a combination of associated facial shapes).

In the example of FIG. 1, a camera 104 is illustrated as taking images of an actor 102. While the example includes one camera 104, it should be understood that multitudes of cameras can be utilized. For example, the cameras may be included in a camera rig, with each camera capturing a high-resolution image of a specific portion of the actor's 102 face. Additionally, two or more cameras may capture a same portion of the actor's 102 face, but taken at different angles (e.g., stereo cameras). In this way, depth information can be obtained. The actor 102 may be requested to make a defined series of facial expressions. For example, the requested facial expressions can include specific Facial Action Coding System (FACS) Action Units. Example Action Units, as described above, may include the raising of the actor's 102 mouth, movement of the actor's 102 eyes, and so on. Additionally, the actor 102 may be requested to smile, frown, and so on, to capture the nuance in these facial expressions. Optionally, images of the actor 102 with his/her eyes closed, mouth open, tongue out, and so on, can be captured. These images may be utilized to generate a more complete three-dimensional model of the actor (e.g., the mouth open can be utilized to inform an inside of the actor's 102 mouth, and so on).

The universal facial expression system 100 includes a capture engine 110 that can receive the images captured by the camera(s) 104, and cause presentation of the images on the user device 130. These images can be utilized to inform the generation of a three-dimensional face model of the actor 102. For example, a user of the user device 130 can generate a three-dimensional model of the actor's 102 neutral facial expression. That is, the neutral facial expression can represent the actor's 102 face with no overt movement of muscles (e.g., the actor's 102 face at rest). To generate this three-dimensional model, the capture engine 110 can combine (e.g., stitch together) images of the actor's neutral face, and generate a point cloud of the neutral face. For example, the point cloud can include multitudes of points defining depth associated with the actor's 102 face at a respective location. That is, each point on the point cloud can represent a surface of the face, and include the point's location in three-dimensional space. This point cloud can therefore represent an accurate model of a topology of the actor's 102 face. The capture engine 110 can output the point cloud, for example for presentation on the user device 130, and the user can generate a three-dimensional model of the face based on the point cloud.

To generate the three-dimensional model, the user can utilize the captured images as texture information to be wrapped around the point cloud. The user can then adjust the three-dimensional model, for example blend textures to create a realistic looking face. Additionally, the user can adjust the three-dimensional model to reduce the model in memory footprint or in processing requirements. As an example, the point cloud may include large numbers of points, and the user can adjust this point cloud to remove a portion. An example of a generated neutral face 112 is illustrated in FIG. 1.

Subsequently, the user of the user device 130 can obtain captured images of the actor's 102 face while the actor 102 was making a face with same facial characteristics as indicated by a particular facial shape identifier. The user can then generate a three-dimensional facial model which can be manipulated to represent the particular facial shape identifier (e.g., an upturned corner of the mouth). For example, the user device 130 can present images of the actor 102 as he/she performed a particular expression associated with a FACS Action Unit (e.g., a raised eyebrow). The user can then adjust the neutral face 112 until the adjusted face conforms to the particular Action Unit (e.g., identifier raised eyebrow).

Since a specific facial shape identifier (e.g., Action Unit) can be associated with movement of a single facial characteristic, the user can ensure that the adjusted face solely includes the specified movement. As an example, if the facial shape identifier indicates a mouth moving upwards, the user can ensure that the only distinction from the neutral face 112 is the upward mouth. Optionally, the capture engine 110 can generate a point cloud from images of the actor 102 performing an expression for a specific facial shape identifier. This generated point cloud may be utilized by the user to inform the adjustment of the neutral face 112 to correspond to the specific facial shape identifier. However, images of the actor 102 captured while the actor was making the expression may include movement of different portions of the face not associated with the specific facial shape identifier. That is, it may be difficult for the actor 102 to solely move his/her mouth upwards without moving other portions of the face. The generated point cloud may thus include movement of additional facial characteristics. As described above, the user can ensure that only facial characteristics of the specific facial shape are moved. For example, the user can view the generated point cloud, images of the actor 102, and so on, to identify an appearance of the actor 102 when making the facial shape identifier, and the user can solely adjust the indicated facial characteristic.

Figure 7A:
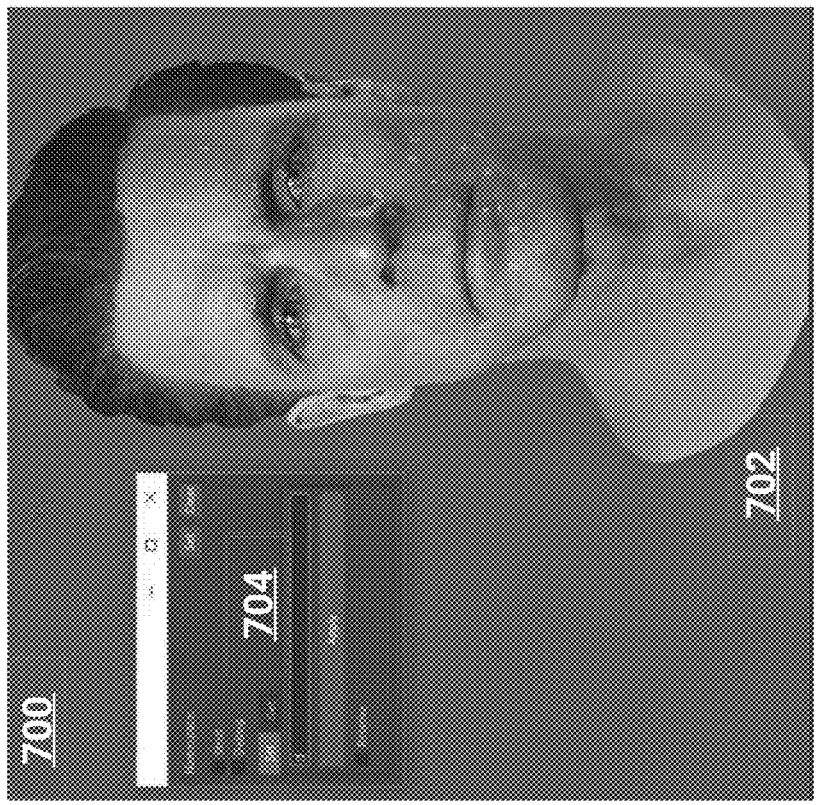
Figure 7B:
FIG. 7B is another illustration of the example user interface.

For the specific facial shape identifier described above, which is based on the neutral face 112 of the actor 102, the user can indicate a maximum movement of the facial characteristic(s) associated with the specific facial shape. For example, if the specific facial shape identifier is associated with an inner eye brow being raised, the user can utilize captured images of the actor 102 to inform a maximum height and a minimum height of the inner brow. The maximum and minimum heights represent a range that the actor 102 can extend his/her inner eye brows. As described above, when animating a character an animator can later indicate an intensity of the specific facial shape identifier. For example, and as illustrated in FIG. 7B, the intensity can be selected from a particular alphanumeric range (e.g., 1 to 5, A to C, A to E, and so on), with each selected intensity informing a height that the inner eye brow on a resulting facial shape is to be extended. As an example of range A to C, the intensity 'A' may include the inner eye brow being raised a third of the way to maximum, while the intensity 'C' may include the inner eye brow being raised to maximum. The user can therefore define the maximum range of facial characteristics associated with each facial shape.

In addition to intensity, each facial shape identifier may be further designated as corresponding to a left or right side of a face. The user can optionally generate two facial shapes for each facial shape identifier, with one being for the left side and one being for the right. For example, a facial shape identifier associated with a mouth moving upwards can have two generated three-dimensional models. The first three-dimensional model can include only the left half of the mouth being moved upwards, and the second model can include only the right half of the mouth being moved upwards. Particular facial shapes however may not have a left and right version, for example a facial shape associated with a narrowing of the nose. In this way, an animator can specify a particular facial shape identifier along with an indication of a side (e.g., left or right) for a character, and an associated facial shape for the indicated side can be obtained.

The defined facial shapes can be stored in a face shape database 122, for example FIG. 1 illustrates a neutral face 112 being stored in the database 122. As described above, each created facial shape can be an adjustment of a three-dimensional face model from a neutral position. The adjustment can include an adjustment of particular points on the three-dimensional model (e.g., wire-frame mesh, specific points in a point cloud), to be raised, lowered, moved, and so on. The modeler (e.g., blend shape artist) can ensure that the movement of these points appears natural, so that when being animated the three-dimensional face model can realistically adjust from a neutral position to a particular facial shape or combination of facial shapes.

The universal facial expression system 100 includes a facial combination engine 120 that can combine facial shapes to create realistic facial expressions. The facial combination engine 120 can utilize rules informing combinations of facial shapes to generate resulting facial expressions. For example, a three-dimensional face model can be automatically rigged by the facial combination engine 120. Thus, if an animator specifies particular facial shape identifiers, a combined facial expression can be output by the system 100. As described above, a combination of facial shape identifiers may be additive, complex, or exclusive. The facial combination engine 120 can utilize rules indicating which combinations of facial shape identifiers are additive, complex, or exclusive, to generate a facial expression. The rules, for example, may be based on the Facial Action Coding System (FACS) described herein.

With respect to an additive combination of facial shape identifiers, the facial combination engine 120 can combine the adjusted facial characteristics of each associated facial shape to generate a facial expression. Since the modeler ensured that the movement of a three-dimensional face model from neutral to a facial shape appeared realistic, the movement of the additive combination can similarly appear realistic. Thus, when being included in a video game or film, the additive combination can be set as a key-frame, and movement from a neutral face or prior facial expression can be interpolated (e.g., over 24, 30, or 60 frames of animation) to the additive combination. With respect to a complex combination of facial shape identifiers, the facial combination engine 120 can obtain one or more corrective shapes, and combine the associated facial shapes and corrective shapes to generate a facial expression. With respect to a mutually exclusive combination of facial shape identifiers specified by a user (e.g., an animator) of the user device 130, the facial combination engine 120 can provide information indicating that the associated facial shapes cannot be combined.

The above included description of obtaining images of an actor 102 to obtain a three-dimensional face model with associated facial shapes. However, it should be understood that new characters not based on actors can be created by modelers and facial shapes defined for these new characters. As an example, a modeler can create a three-dimensional face model for a new character (e.g., the modeler can create a model from scratch, from a combination of prior created models, and so on). The universal facial expression system 100 can analyze the morphology of the created face model, and determine three-dimensional face models of characters that are closest to the created face model. The system 100 can access the face shape database 122, and analyze neutral faces of different characters, and identify characters with features similar to the features of the created face model. For example, the universal facial expression system 100 can analyze spacing between facial characteristics (e.g., spacing between eyes, mouth, and so on), information for each facial characteristic (e.g., whether corners of a mouth of the created character are upwards or downwards pointing, an extent to which a brow is furrowed, nostrils are flared), and so on.

The universal facial expression system 100 can then identify one or more closest characters that have facial shapes stored in the face shape database 122. For example, based on the analyses described above the system 100 can determine measures associated with distinctions between the created face model and the previously created characters. Measures may be determined according to the spacings described above (e.g., a vector norm may be computed), correlations between each facial characteristic, and so on. Subsequently, the universal facial expression system 100 can, optionally, automatically adjust the created face model to define facial shapes based on the identified closest characters. With respect to an example facial shape in which an eye brow is raised, the universal facial expression system 100 can adjust the three-dimensional model of the created face the same as an adjustment of a closet character's neutral face to the example facial shape. For example, the system 100 can move an underlying wire-frame mesh, or particular points in a point-cloud, as the closest character's neutral face was moved. Optionally, the system 100 can introduce randomness into the creation, for example slightly differently extending a range of an upward movement of a mouth, adjusting an angle of an eye brow as its being moved differently, and so on. Optionally, during creation of a new character's three-dimensional face model, a modeler can indicate portions of the model that correspond to facial characteristics (e.g., eyebrows, mouth, and so on). In this way, the system 100 can adjust these facial characteristics as were adjusted in prior created character's three-dimensional face models.

Optionally, when creating a new three-dimensional face model, a modeler can select from an existing underlying wire-frame mesh or point cloud of a created character, and then modify the textures appearing on this mesh or point cloud. For example, the modeler can adjust a skin color, look of the mouth or eyes, add a horn or trunk (e.g., instead of a nose), and so on, while preserving the structure of the existing character's face model. In this way, different face models for characters can be rapidly created by modelers. Since these face models utilize the same, or similar, underlying wire-frame mesh or point cloud, the universal facial expression system 100 can automatically define facial shapes as were defined for the existing character.

Via the universal facial expression system 100, a user of the user device 130 can cause creation of disparate three-dimensional face models and associated facial shapes. Thereafter, a user can indicate facial shape identifiers for one or more characters, and obtain resulting facial expressions based on the indicated identifiers. For example, the user device 130 can present a user interface (e.g., user interface 700 illustrated in FIG. 7A), and the user can specify facial expressions that are to be applied to any character in a video game or film. These specified facial expressions can then be imported into video games, and in real-time generated by a video game console during gameplay.

Optionally, the facial expression system 100 can monitor video of an actor, and automatically generate combinations of facial shape identifiers that, when combined, result in same facial expressions as the actor. For example, a three-dimensional face model can be generated based on images of the actor, and facial shapes defined for a multitude of facial shape identifiers. Subsequently, the actor can be requested to act out a scene which will be included in a video game or film. The system 100 can monitor the acting, and determine facial shape identifiers during the acting. For example, the system 100 can utilize one or more machine learning models that are trained to detect movement of facial characteristics and label the movements according to facial shape identifiers. For instance, the labeling can correspond to the Facial Action Coding System. The machine learning models may include neural networks, and the system 100 can therefore utilize these machine learning models to realistically model an actor's nuanced facial expressions. In contrast to prior systems, the universal facial expression system 100 can combine 10, 20, 30, different facial shape identifiers that have been defined for a specific actor, to generate complex facial expressions that mimic an actor's performance.

Process for Defining Facial Shapes

Figure 2A:
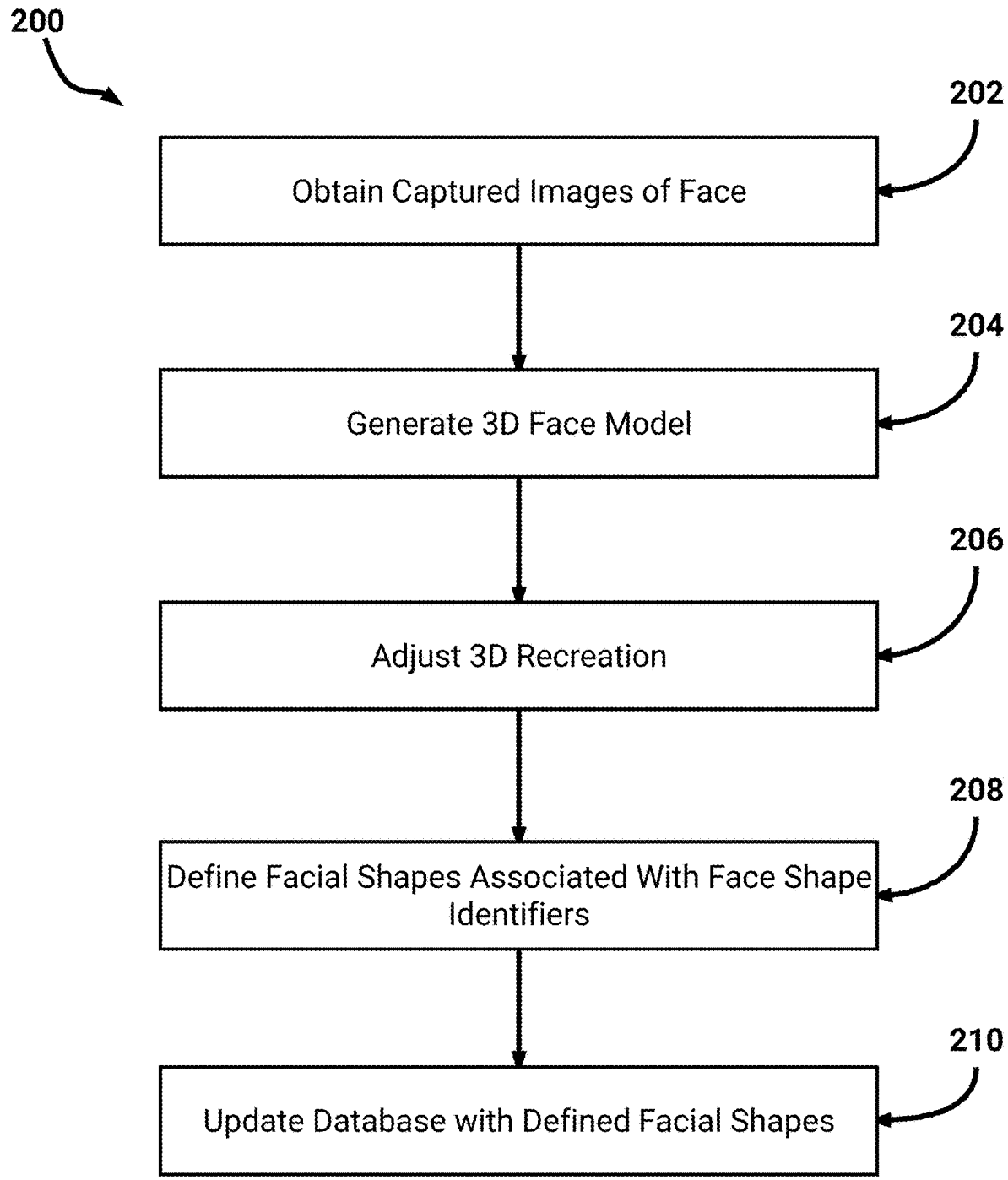
FIG. 2A is a flowchart of an example process for defining facial shapes of a character.

FIG. 2A is a flowchart of an example process 200 for defining facial shapes of a character. For convenience, the process 200 will be defined as being performed by a system of one or more computers (e.g., the universal facial expression system 100).

At block 202, the system obtains captured images of a face. As described above, a camera rig (e.g., a rig of one or more cameras, depth sensors, and so on) can be positioned at an actor. The actor can be requested to adjust his/her face to make specific facial characteristics or make a series of facial expressions, and the camera rig can obtain one or more images of the actor as the actor adjusts his/her face. For example, the actor can be provided with information identifying an order of facial expressions to perform. As an example, the actor may be requested to make 60, 70, 80, and so on, specific facial expressions for the camera rig to capture.

The system can obtain images captured of the face, and store the images for analyzing and processing as described below. The images captured of a specific facial expression may be associated with an identifier, so that a modeler can view these images when modeling a particular face shape. For example, images obtained of an actor while the actor is raising his/her eyebrows can be associated with (e.g., tagged with) a facial shape identifier that indicates a raising of eyebrows. As another example, images obtained of an actor while the actor is performing a particular facial expression (e.g., smile), can be associated with one or more facial shape identifiers, which when combined, form the particular facial expression. As will be described below, the system can present the obtained images associated with a particular facial shape identifier while a modeler is defining an associated facial shape for a character.

At block 204, the system generates a three-dimensional face model of the character. A modeler can utilize the obtained images to create a three-dimensional face model of the actor. The system can generate an underlying topological (e.g., geometrical) representation of the face, and textures of the face based on the captured in the images.

Without being constrained by theory, an example scheme for the system to create a topological point-cloud of the face is described. Other schemes can be utilized that create a geometrical representation of the face (e.g., a wire-frame, point-cloud, and so on), and fall within the scope of the disclosure. Subsequent to obtaining images of the face, as described above, the system can perform a photogrammetry process to create three-dimensional geometry of the face. As an example, the camera rig described above may include cameras pointed at different portions of the actor's face. Images of the face may be taken at a same time, such that the images may illustrate different viewpoints of the actor's face. The system can then correlate points between the images, to determine a mapping between the images. For example, a first image may include a particular portion of the actor's face. A second image may include a different view of the particular portion (e.g., a different angle). The system can identify points in each image that correspond to each other, for example utilizing a least squares matching algorithm (e.g., Levenberg-Marquardt algorithm). Camera information may be utilized in part to determine three-dimensional locations of the matched points (e.g., an X, Y, Z coordinate, in an example coordinate system), for example orientation of the cameras with respect to a frame of reference, distance of the cameras to the actor, focal length of the lenses, and so on. The resulting point-cloud of the actor's face can include multitudes of points each with three-dimensional locations that form the underlying geometry of the face. Optionally, a meshed surface can be generated from the point-cloud, and as will be described below, a texture can be wrapped around this meshed surface.

The images of the face can be utilized as textures of the three-dimensional face model, for example on top of the geometrical representation of the face. The system can optionally select portions of multiple images to be utilized as a texture on the geometrical representation. Since a single image may not include an entirety of the face, or portions may be off-axis or otherwise less clear, the system can optionally stitch together portions of images to obtain a texture for application over the geometrical representation. Similarly, a single image of the actor will not include both the face with eyes opened and closed, and mouth opened and closed. Therefore, images of the actor's closed eyes, open mouth, and so on, can be utilized as texture information for the three-dimensional model. In this way, for a facial shape that includes closed eyes, open mouth, and so on, the three-dimensional face system can access the texture information. The modeler can then perform blending to arrive at the generated three-dimensional face model.

The generated three-dimensional face model can represent a neutral (e.g., resting) face of the actor. For example, the neutral face 112 illustrated in FIG. 1. The three-dimensional face model can be manipulated, for example in a user interface presented, at least in part, via the system. As an example, the modeler can select a portion of the three-dimensional face model (e.g., a mouth), and adjust the portion upwards, downwards, and so on. Since the texture is applied to a top of the geometric representation, the modeler can adjust the geometric representation and the texture can be similarly adjusted. As will be described below, with respect to block 208, the modeler can adjust the three-dimensional face model to conform to the facial shape identifiers. In this way, the modeler can define facial shapes associated with the facial shape identifiers, which can be combined to create facial expressions.

While the description above focused on images of the actor to generate a three-dimensional face model of the character, the modeler can adjust the textures applied to the model to create different appearances. For example, the modeler can adjust the textures to make the character appear as an animal, alien, mythical creature, and so on. However, the three-dimensional face model can be based on the images, ensuring that the resulting character appears lifelike regardless of the final appearance it takes.

At block 206, the system adjusts three-dimensional face model. Optionally, the system can adjust the geometric representation of the face model to reduce memory and processing requirements. For example, the sparseness of the point cloud can be increased (e.g., points can be pruned or otherwise removed), while the geometry is preserved. In this way, memory requirements to store the three-dimensional face model can be reduced due to the lesser quantity of points. With respect to the example of a video game system, the video game system can utilize less internal memory to store the three-dimensional face model during gameplay. For example, when a character that includes the three-dimensional face model is animated, memory utilization can be lessened. Similarly, processing power required to animate the character can be reduced due to the simpler movement of the underlying geometric representation. As an example, a character's face may be animated from a first key-frame, for which a first facial expression is presented, to a second key-frame, for which a second facial expression is presented. Based on reducing complexity of the geometric representation, the processing required to interpolate between these facial expressions can be reduced. For example, computations regarding movement of portions of the three-dimensional face model (e.g., points in a point-cloud, portions of a wire-frame mesh, and so on) can be reduced.

At block 208, the system defines facial shapes associated with facial shape identifiers (block 208). As described above, the three-dimensional face model of the character can represent a neutral face from which facial shapes can be defined. For example, the neutral face can be a resting face of an actor whose images were obtained by the system. A modeler can utilize the three-dimensional face model to define particular facial shapes, which can be combined to output complex facial expressions. Each facial shape can be associated with a respective facial shape identifier, and an animator can reference these facial shape identifiers when creating combinations. Combining facial shapes is illustrated in FIG. 7A, and described below.

To define a facial shape for a facial shape identifier, a modeler can adjust the three-dimensional face model according to the facial characteristics indicated by the facial shape identifier. As described above, each facial shape identifier may indicate particular adjustment of one or more facial characteristics, such as adjustment of one or more muscles, portions of a face, and so on. For example, a particular facial shape identifier can indicate an upward adjustment of a mouth. The modeler can utilize a user interface, for example presented by the system or presented in a user device (e.g., presented in an application, such as a CAD application), to adjust the three-dimensional face model.

To ensure accuracy of the resulting facial shape, the system can present images that were captured while the actor was adjusting his/her face in conformance with the facial shape identifier. With respect to the example of an upward adjustment of a mouth, the system can obtain images (e.g., from one or more databases) that are associated with (e.g., tagged with) the particular facial shape identifier. The system can then present the obtained images, and the modeler can adjust the three-dimensional face model to appear similar to the obtained images. For example, the modeler can select portions of the model and adjust them upwards, downwards, to the side, at various angles, and so on. Since the three-dimensional face model includes an underlying geometric representation, adjustment of a particular portion (e.g., a mouth), can automatically adjust other portions of the model as the particular portion is moved. Additionally, when adjusting the three-dimensional face model to define a facial shape, the modeler can ensure that movement from the neutral position to the facial shape appears realistic. Since the movements will be later animated, for example in a video game or film, the realistic movement between facial shapes can be enhance realism of the character.

Optionally, to define a facial shape the system can automatically adjust the three-dimensional face model based on associated obtained images. For example, the system can compare the images of the actor's neutral expression with the images of the actor adjusting his/her facial characteristics. This comparison can inform the system's adjustment of the underlying geometric representation (e.g., adjustment of the point-cloud, wire-frame mesh, and so on). As an example, the system can obtain images of the actor's mouth adjusted upwards, and can wrap the images on the three-dimensional face model. The system can then identify that the portions of the geometric representation associated with the mouth are to be correspondingly moved upwards (e.g., based on matching the position of the mouth as compared to the geometrical representation with the position of the mouth in the neutral expression). Based on facial shapes defined for prior characters, the system can ensure that movement from the neutral expression to a facial shape appear realistic. For example, when automatically adjusting the face upwards, the system can utilize movements of the mouth for prior-defined characters to inform movement of the current character.

The system can additionally monitor progress of the modeler with respect to defining all of the facial shapes, and can indicate remaining facial shape identifiers that need defined facial shapes. The modeler can select a particular facial shape identifier, and the system can obtain images that are associated with the particular facial shape identifier (e.g., as described above). In this way, efficiencies related to defining the facial shapes can be increased. Additionally, multitudes of modelers can define different facial shapes for the three-dimensional face model at a same time. The system can present updates (e.g., in substantially real-time) indicating new facial shapes, which the modelers can view to ensure consistency in the different facial shapes.

As described above, a combination of facial shape identifiers can be selected (e.g., by an animator) to create a facial expression for the character. As will be described below, with respect to FIGS. 6-7B, the system can combine defined facial shapes associated with the facial shape identifiers to generate a resulting facial expression. As further described above, a combination can be additive such that the system can interpolate from an initial facial expression (e.g., a neutral facial expression) to the resulting facial expression via movement of the facial characteristics indicated by each facial shape identifier. For example, if a first facial shape identifier indicates movement of a mouth upwards, and a second facial shape identifier indicates movement of a brow downwards, the mouth and brow can be adjusted over a series of frames (e.g., 24, 30, 60). A mutually exclusive combination can alternatively indicate that facial shapes conflict and are unable to be combined.

A combination may also be complex such that movement of facial characteristics indicated by each facial shape identifier may result in an incorrect facial expression when combined. To generate the facial expression intended via the combination, one or more corrective shapes may be required. These corrective shapes can be utilized by the system to inform movement of the three-dimensional face model, for example during interpolation to the facial expression. A modeler can define these corrective shapes according to rules, such as rules defined by the Facial Action Coding System (FACS). An example of a complex combination is described below, and illustrated in FIGS. 2B-2D.

At block 210, the system updates a database with the facial shapes. The system can store the defined facial shapes as being associated with the character. In this way, an animator can specify combinations of facial shape identifiers for this character, and resulting facial expressions can be presented (e.g., as illustrated in FIG. 7A).

In addition to defining facial shapes for a character that are based on images of an actor, new characters can be created and facial shapes for these characters automatically defined. For example, a modeler can create a new three-dimensional face model, for example one not based on images of an actor, and the system can determine facial shapes for this new three-dimensional face model.

Figure 2B:
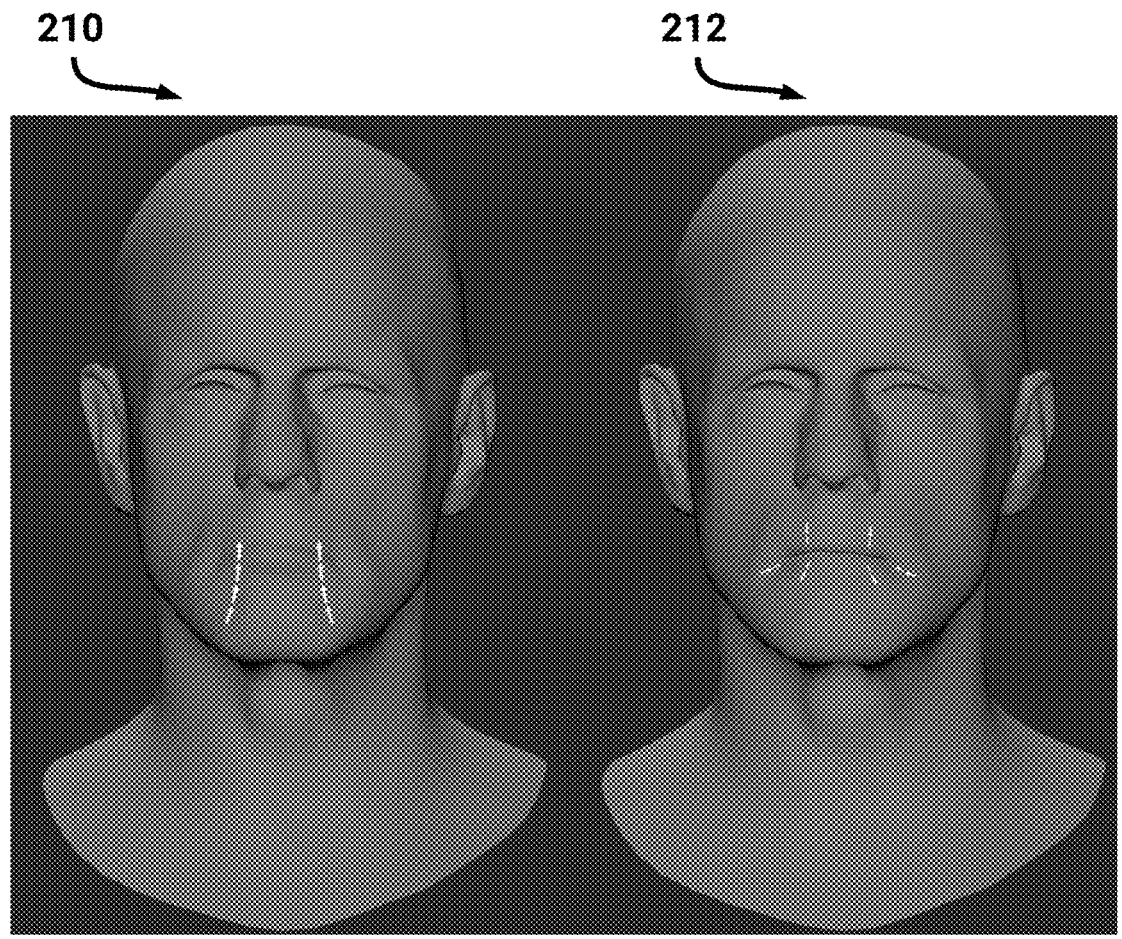
FIG. 2B illustrates a complex combination of facial shapes.
Figure 2C:
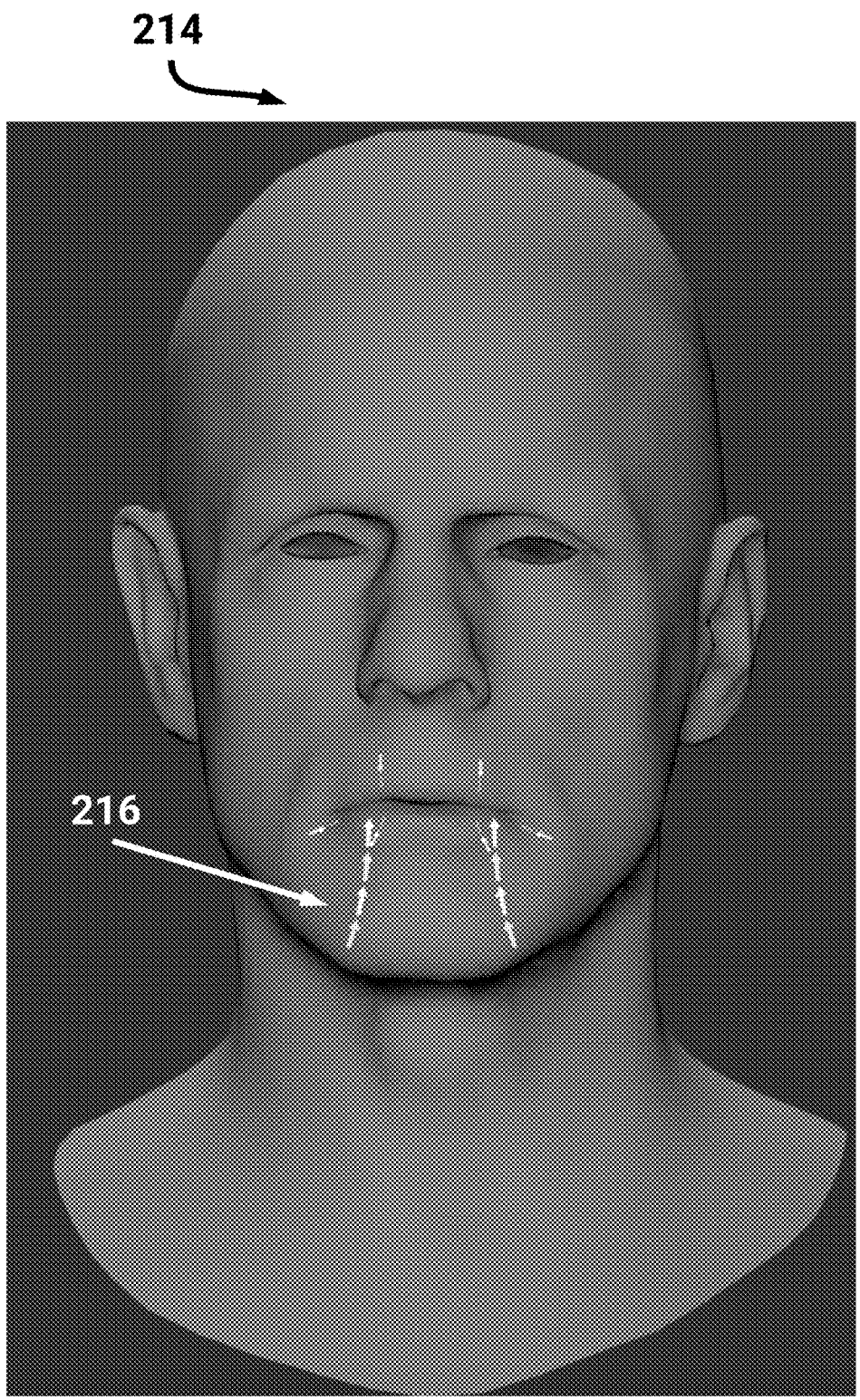
FIG. 2C illustrates a corrective shape associated with the complex combination.

FIG. 2B illustrates a complex combination of facial shapes 210, 212. As illustrated, facial shape A 210 illustrates a lower lip of a character being moved upwards from a neutral expression. Similarly, facial shape B 212 illustrates a contraction of the mouth inwards. Since movement from an initial facial expression, such as a neutral expression, to each facial shape 210, 212, adjusts a same area of the face (e.g., the mouth), the combination can conflict.

FIG. 2C illustrates a corrective shape 214 associated with the complex combination. A modeler can define corrective shapes which can be utilized to generate a facial expression for a complex combination. The corrective shape can be defined according to rules associated with combining particular facial shape identifiers, for example according to the FACS system described herein. As illustrated, the corrective shape 214 indicates an adjustment of a three-dimensional face model for a character, along with proper movement of portions of the model. For example, FIG. 2C illustrates arrows 216 on the corrective shape 214A which indicate movement of the mouth in the complex combination.

The corrective shape 214 is specific to the combination of facial shapes 210, 212, and additional corrective shapes can be defined for other combinations. For example, a complex combination can include facial shape identifier A, facial shape identifier B, and an arbitrary facial shape identifier C. As described above, facial shape identifier A and B are a complex combination. However, facial shape identifiers A, B and C may also be a complex combination, and the combination of facial shape identifiers A, B, C, may utilize a corrective shape defined for the combination of facial shape identifiers A, B and C (e.g., not corrective shape 214). Example corrective shapes are illustrated in FIG. 5B. In contrast, if facial shape identifier C is additive with respect to the combination of facial shape identifiers A and B, the combination may include facial shape A, B, C, and corrective shape 214.

Figure 2D:
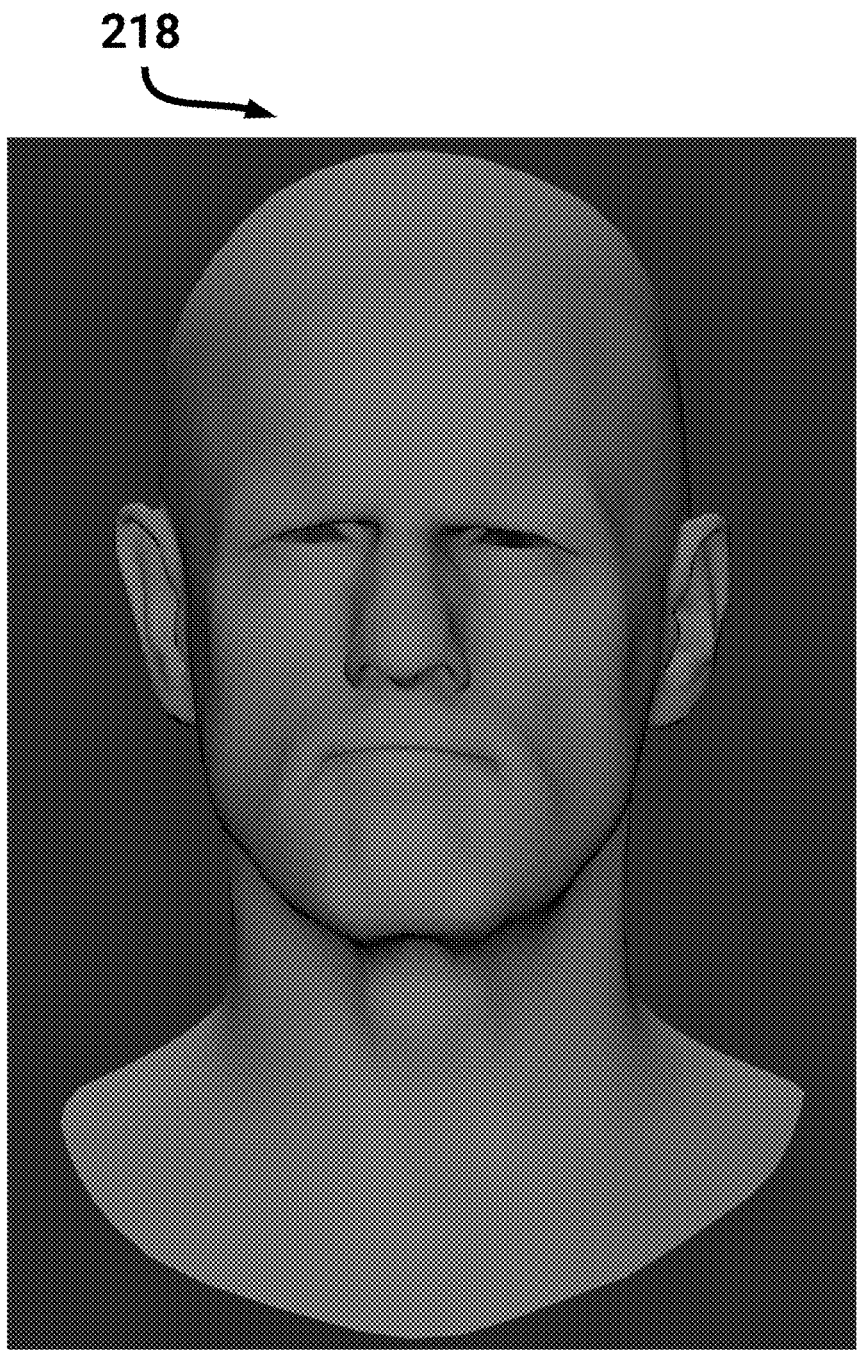
FIG. 2D illustrates a resulting facial expression associated with the complex combination.

FIG. 2D illustrates a resulting facial expression 218 associated with the complex combination. As illustrated, the facial expression 218 is a combination of facial shape A 210, facial shape B 212, and the corrective shape 214. In this way, an animator can specify the combination of facial shape identifier A and facial shape identifier B, and the system can automatically identify that corrective shape 214 is required to arrive at the intended facial expression 218.

Process for Defining Facial Shapes for a New Character

Figure 3:
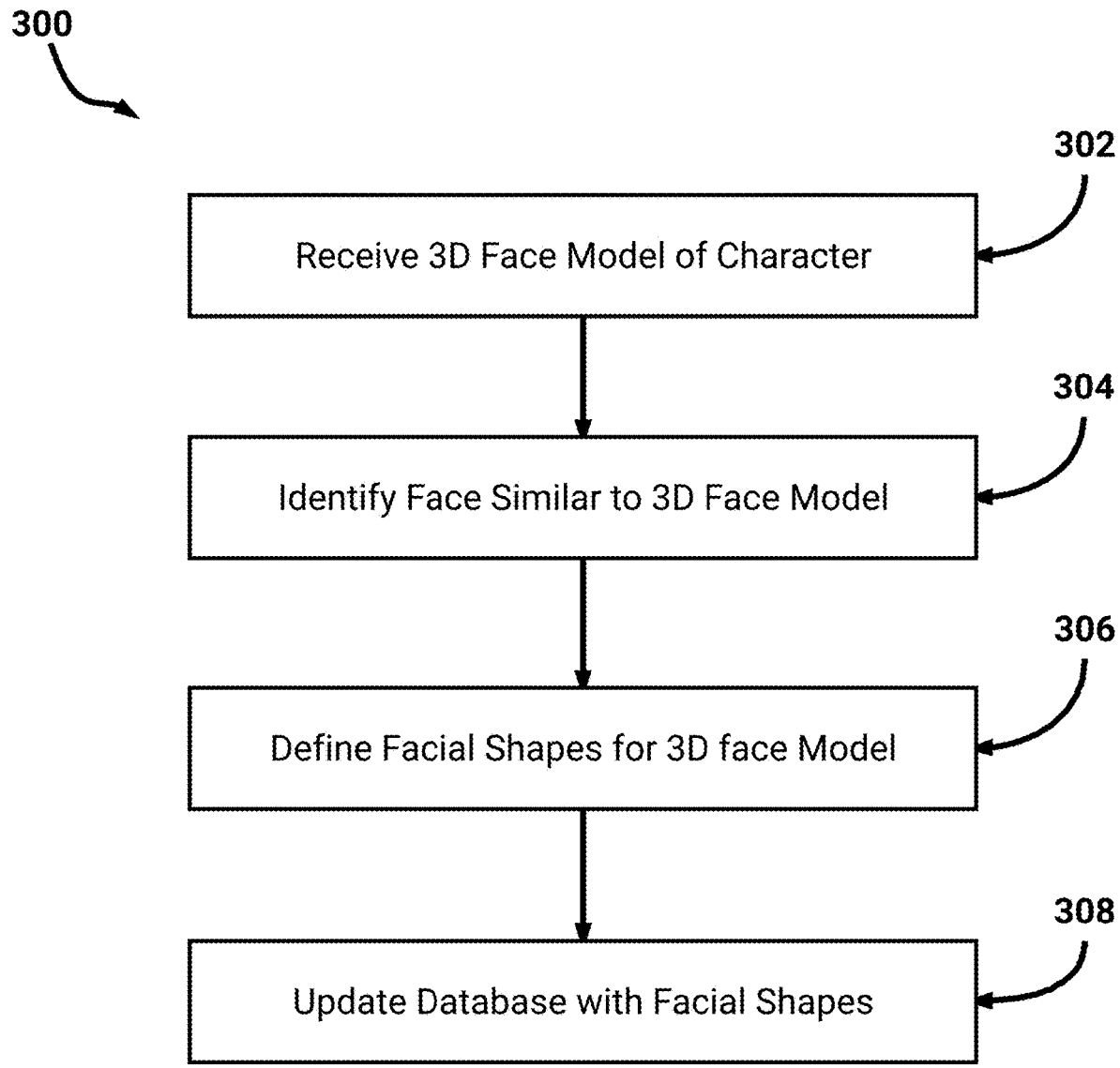
FIG. 3 is a flowchart of an example process for defining facial shapes based on a 3D model of a new character.

FIG. 3 is a flowchart of an example process 300 for defining facial shapes based on a 3D model of a new character. For convenience, the process 300 will be described as being performed by a system of one or more computers (e.g., the universal facial expression system 100).

At block 302, the system receives a three-dimensional face model of a character. As described above, with respect to FIG. 2A, images of an actor can be utilized to inform generation of a three-dimensional face model. However, a modeler can create a model of a face to his/her liking, for example not based on images of a person. Similarly, a modeler can adjust a three-dimensional face model previously created, to expand the range of faces available for inclusion in a video game or film.

At block 304, the system identifies prior three-dimensional face models that are similar to the received three-dimensional face model. The system analyzes the morphology of the new model, for example the underlying geometric representation, and identifies one or more prior models with similar morphology. As described above, with respect to FIG. 1, the system can compare locations of particular facial characteristics such as a mouth, nose, eyes, eye brows, and so on. Additionally, the system can compare distances between these facial characteristics.

At block 306, the system defines facial shapes for the new three-dimensional face model. The system utilizes the identified face models to inform automatically defining facial shapes, and optionally corrective shapes, for the new face model. As an example, a particular facial shape identifier can indicate a mouth moving upwards. The system can obtain the facial shape of an identified face model for this particular identifier, and based on movement of the facial shape from a neutral expression for the identified model, can similarly move the new face model. For example, the system can move a mouth on the new face model a similar distance upwards (e.g., defining a range for the movement, which can inform an intensity as described above). Optionally, the system can utilize two or more prior face models to define facial shapes for the new face model. For example, particular facial characteristics of the new face model may be more similar to a first face model, and other facial characteristics of the new face model may be more similar to a second face model. Thus, for facial shape identifiers indicating the particular facial characteristics, the system can utilize the first face model.

At block 308, the system updates a database with the facial shapes. The system can store the defined facial shapes as being associated with the character. In this way, an animator can specify combinations of facial shape identifiers for this character, and resulting facial expressions can be presented (e.g., as illustrated in FIG. 7A).

Process for Defining Facial Shapes Using Limited Capture Images

Figure 4:
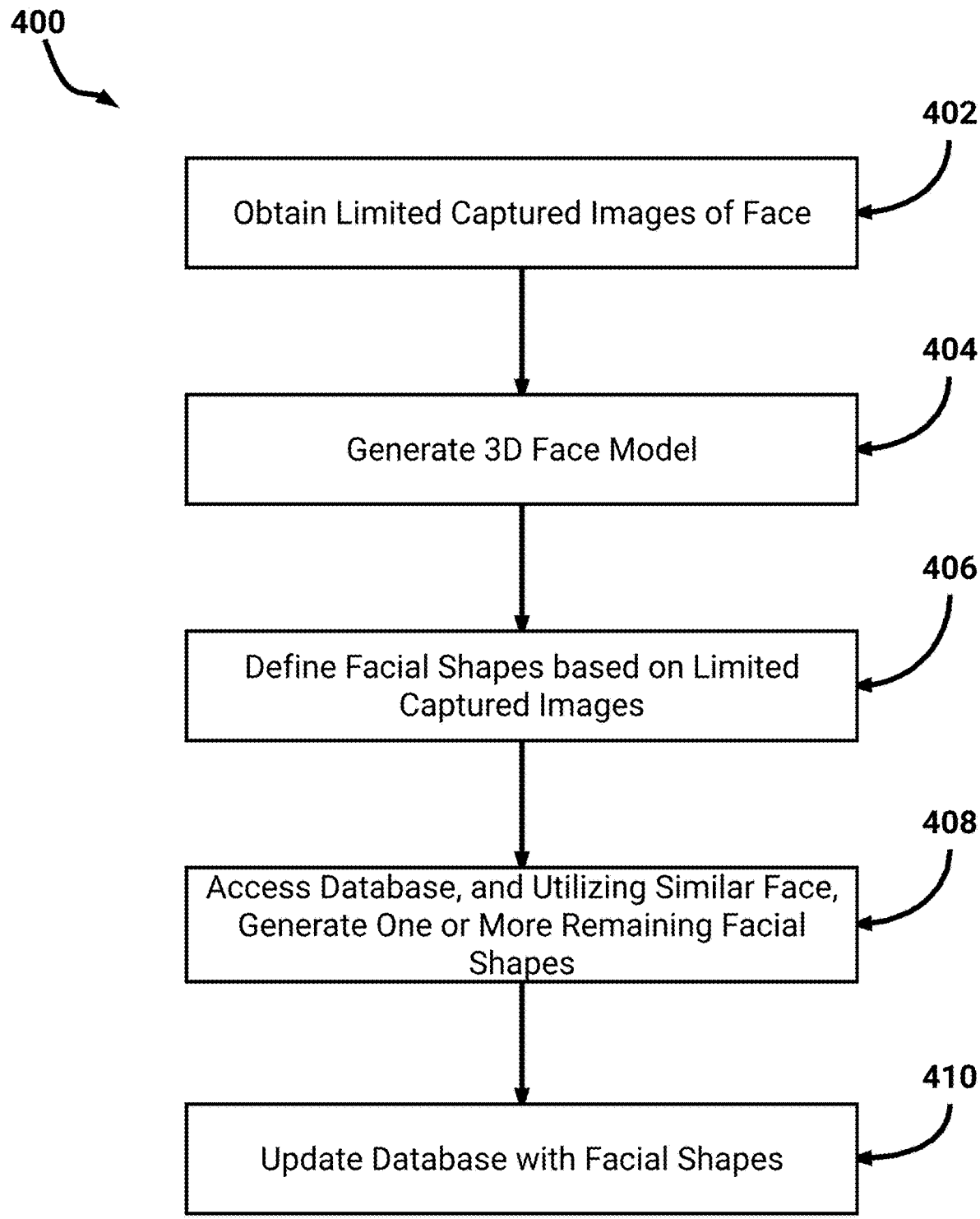
FIG. 4 is a flowchart of another example process for defining facial shapes of a character.

FIG. 4 is a flowchart of another example process 400 for defining facial shapes of a character. For convenience, the process 400 will be described as being performed by a system of one or more computers (e.g., the universal facial expression system 100).

At block 402, the system obtains limited captured images of an actor's face to be utilized for a character. As described above, with respect to FIG. 2A, images of an actor can be obtained and utilized to generate a three-dimensional face model. For particular characters, such as less important characters, a lesser quantity of images may be taken of the actor. For example, the actor may be requested to make 6, 10, 15, facial expressions which can be obtained via a camera rig. Since these particular characters may be background characters, they are less likely to require as many facial shapes as a main character. However, similar to FIG. 3, the system can optionally generate remaining facial shapes that are based on similar, prior-created, three-dimensional face models of characters.

At block 404, the system generates a three-dimensional face model. As described above, with respect to FIG. 2A, the obtained images can be utilized to generate a three-dimensional face model. For example, a neutral expression can be determined based on the obtained images.

At block 406, the system defines facial shapes. A modeler can utilize the images obtained of the actor, and define facial shapes based on the facial expressions made by the actor. For example, the actor may have been requested to smile, and the modeler can define facial shapes which, in combination, can create a smiling facial expression. However, the modeler may not have access to sufficient images to define all facial shapes, for example all facial Action Units.

At block 408, the system optionally generates remaining facial shapes based on similar faces. As described above, with respect to FIG. 3, the system can analyze the morphology of the generated three-dimensional face model, and identify similar three-dimensional face models. Based on these similar models, the system can generate remaining facial shapes. While, as an example, the generated facial shapes may not be as lifelike as facial shapes defined based on explicit images, for particular characters they may provide realism while reducing complexities associated with defining all facial shapes.

At block 410, the system updates a database with the facial shapes. The system can store the defined facial shapes as being associated with the character. In this way, an animator can specify combinations of facial shape identifiers for this character, and resulting facial expressions can be presented (e.g., as illustrated in FIG. 7A).

Figure 5A:
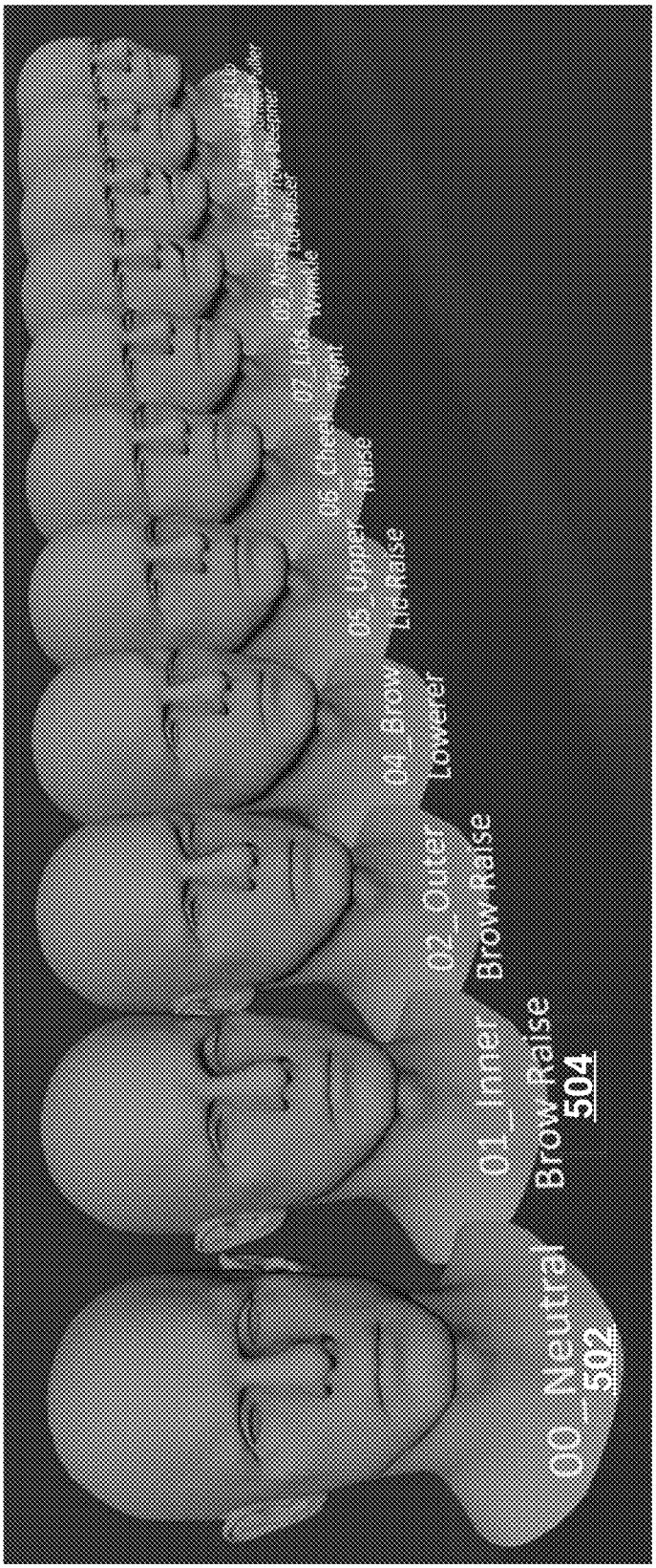
FIG. 5A illustrates example facial shapes.
Figure 5B:
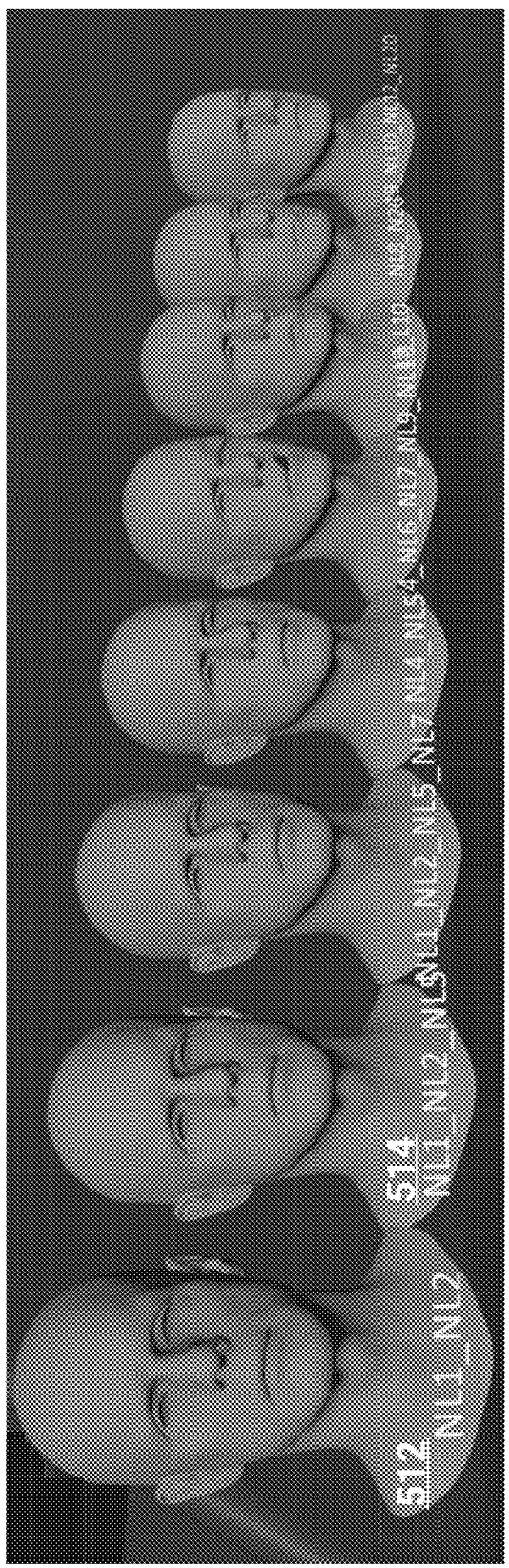
FIG. 5B illustrates examples corrective facial shapes.

FIG. 5A illustrates example facial shapes 500. As described above, facial shapes can be defined for a character and utilized in combinations to create facial expressions. FIG. 5A illustrates example facial shapes, such as a neutral facial shape 502, an inner brow being raised 504, and so on.

FIG. 5B illustrates examples corrective facial shapes 510. As described above, particular combinations of facial shape identifiers may be complex and require inclusion of one or more corrective shapes. FIG. 5B illustrates example corrective shapes 510, for example a corrective shape 512 utilized in a combination with an inner brow being raised and an outer brow being raised. Corrective shape 514 is to be utilized in a combination with an inner brow being raised, an outer brow being raised, and an upper eye-lid being raised. Corrective shapes 512 and 514 both are associated with two of the same facial shape identifiers (e.g., outer eye brow raised, inner eye brow raised), however corrective shape 514 is further associated with the upper eye-lid being raised. Thus, for a complex combination in which the inner eye brow is raised, and the outer eye brow is raised, the system can automatically utilize corrective shape 512. Similarly, for a complex combination that further includes the upper eye-lid being raised, the system can automatically utilize corrective shape 514 (e.g., not corrective shape 512).

Process for Importing Facial Expressions into Game Applications

Figure 6:
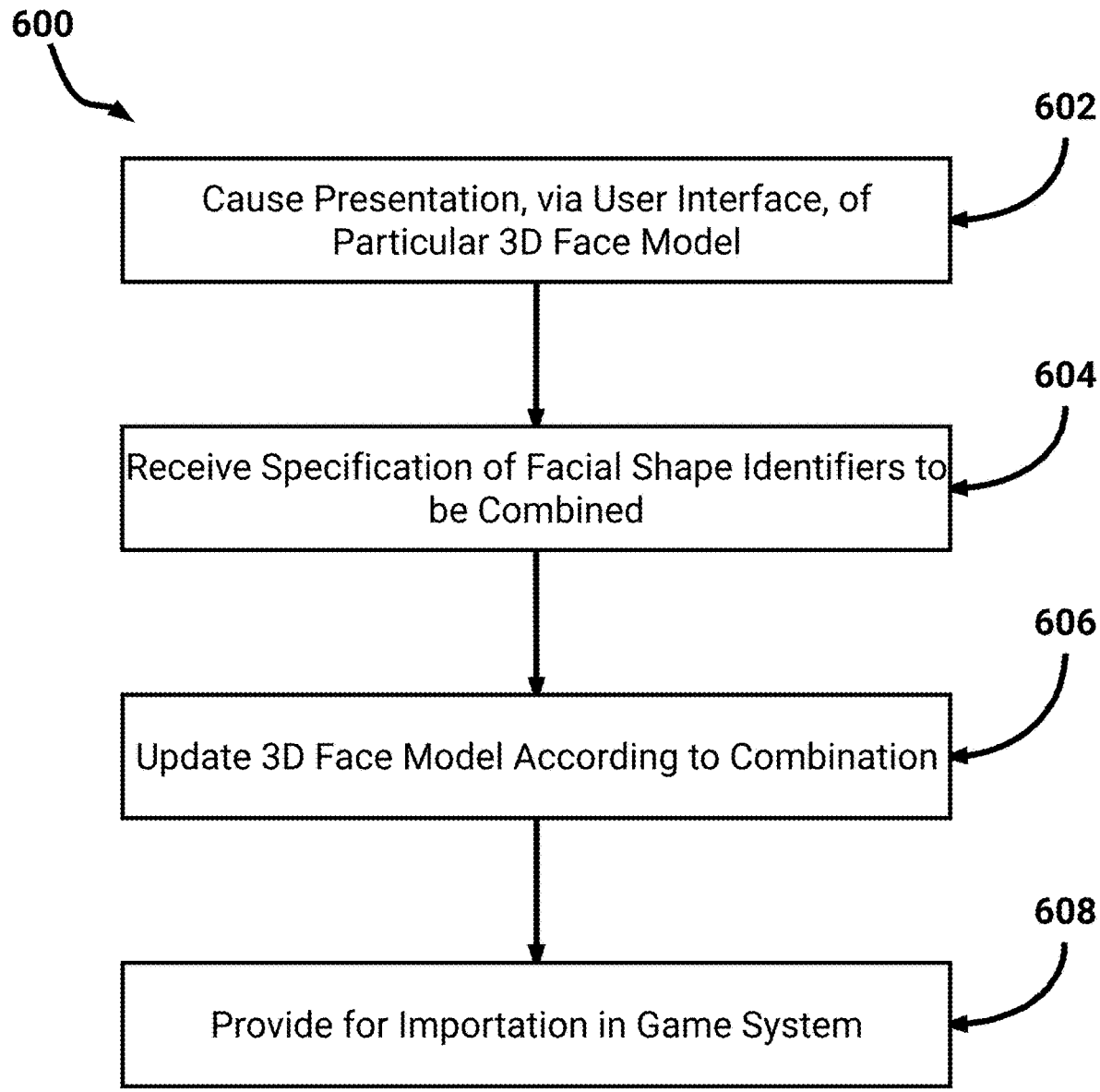
FIG. 6 is a flowchart of an example process for importing facial expressions into a video game.

FIG. 6 is a flowchart of an example process 600 for importing facial expressions into a video game application. For convenience, the process 600 will be described as being performed by a system of one or more computers (e.g., the universal facial expression system 100, a user device, and so on).

As described above, an animator can specify combinations of facial shape identifiers and a three-dimensional face model can be updated to reflect the combination. The combination can be associated with a complex facial expression, such as a smile, frown, and so on.

At block 602, the system causes presentation of a particular three-dimensional face model. An animator can utilize an application, for example a CAD program, and access three-dimensional face models of different characters. The animator may utilize the system to present the model, a user device in communication with the system, and so on. For example, FIG. 7A illustrates an example user interface 700 for generating facial expressions. As illustrated, the user interface 700 includes a three-dimensional face model 702 of a character. The model 702 can be interactive, such that user input in the user interface 700 can cause the model 702 to rotate in three-dimensions. Additionally, the user interface 700 includes a portion 704 in which the animator can specify facial shape identifiers.

At block 604, the system receives specification of facial shape identifiers. The animator can utilize portion 704 to input facial shape identifiers, for example in the example of FIG. 7A facial shape identifiers 4, 5, 7, 17, 24, 38, which as an example may correspond to facial Action Units. The animator can then provide user input to indicate that the combination is to be applied (e.g., the animator can select the "Apply" selectable object).

At block 606, the system updates the three-dimensional face model according to the combination. As illustrated in FIG. 7A, the user interface 700 has updated the three-dimensional face model 702 with a particular facial expression 706 based on the combination. The user interface 700 can update with the resulting facial expression 706, and can optionally (e.g., based on a user setting, toggle, and so on) illustrate the model 702 animating to the resulting facial expression 706 (e.g., over a series of frames, such as 24, 30, 60, and so on, which can be presented over a second, two seconds, user-selectable threshold amount of time, and so on).

As described above, the combination may be additive, complex, or mutually exclusive. The system can seamlessly update the face model 702 without the animator being concerned as to whether the combination is additive or complex. For example, if the combination is complex, the system can access the facial shapes associated with the combination, and include appropriate corrective shapes. For a mutually exclusive combination, the system can update the update the user interface 700 to indicate that the combination cannot be combined. Optionally, the system can provide recommendations as to combinations which may have been intended (e.g., a threshold number of recommendations, such as 2, 4, 6). For these recommended combinations, the user interface 700 can include the associated facial expressions (e.g., as thumbnails). To identify recommendations, the system can monitor common facial expressions utilized by animators. The system can then compare the specified combination in portion 704 with these common facial expressions, and identify facial expressions that are most similar to the combination.

At block 602, the system provides the particular facial expression 706 for importation in a video game. The system can generate information indicate the combination of facial shape identifiers specified in portion 704, and can include this information in a video game. Additionally, the video game can access the defined facial shapes for the character, and in real-time generate the facial expression 706 based on the facial shapes and combination of facial shape identifiers.

An animator can thus define sequences of combinations of facial shape identifiers, and the video game can transition between the resulting facial expressions during gameplay. For example, the animator can specify a first facial expression in a first key-frame, and the video game (e.g., when executed by a video game console or system) can interpolate from this first facial expression to a second facial expression in a subsequent key-frame.

FIG. 7B is another illustration of the example user interface 700. FIG. 7B illustrates the three-dimensional face model 702 manipulated by an animator. For example, the animator can provide user input to adjust specific facial characteristics, such as selecting corners of a mouth and dragging downwards (e.g., on a touch screen display, using a mouse, and so on). Thus, the manipulated three-dimensional face model 708 can be presented in the user interface 700. To obtain the facial shape identifiers that, when combined, would form this manipulated face model 708, the animator can request that the system identify the combination (e.g., using portion 710). The system (e.g., system 100) can identify the movement of the model 702, and compare the movements to facial shapes of the character. For example, the user interface 700 indicates the manipulated face model 708 can be generated via specifying a combination 712 of facial shape identifiers 2B and 17D. As described above, an alphanumeric can be optionally be utilized to specify an intensity associated with a facial shape. Thus, the system has determined an intensity of 'B' for facial shape identifier 2, and an intensity of D for facial shape identifier 17.

In this way, animators can quickly adjust face models to their liking (e.g., via direct manipulation), and can share these complex facial expressions with other animators by requesting combinations that form these adjusted face models. As an example, if an animator adjusts a face model of a first character in a particular way that he/she finds interesting, the animator can share the combination of facial shape identifiers with a different animator, who can utilize this same combination for a second character. The first and second character can therefore present a same facial expression, which may be realistically distinct based on the techniques described herein (e.g., the characters may be based on different actors, they may have different neutral expressions, their morphology may be distinct, and so on).

Example Hardware Configuration of Computing System

Figure 8:
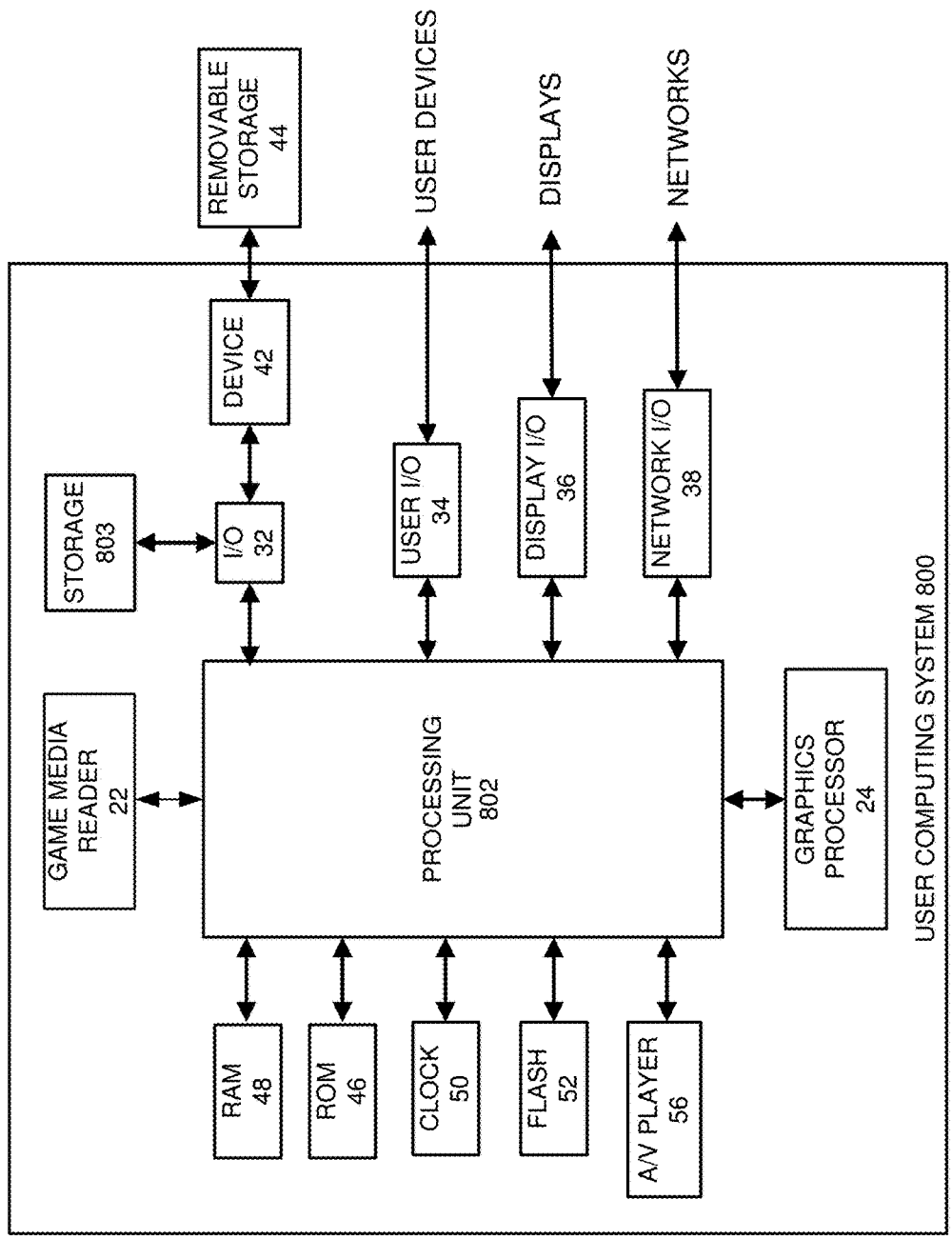
FIG. 8 shows a block diagram of an example computing system.

FIG. 8 illustrates an embodiment of a hardware configuration for a computing system 800 (e.g., user device 130 and/or universal facial expression system 100 of FIG. 1). Other variations of the computing system 800 may be substituted for the examples explicitly presented herein, such as removing or adding components to the computing system 800. The computing system 800 may include a computer, a server, a smart phone, a tablet, a personal computer, a desktop, a laptop, a smart television, and the like.

As shown, the computing system 800 includes a processing unit 802 that interacts with other components of the computing system 800 and also components external to the computing system 800. A game media reader 22 may be included that can communicate with game media. Game media reader 22 may be an optical disc reader capable of reading optical discs, such as CD-ROM or DVDs, or any other type of reader that can receive and read data from game media. In some embodiments, the game media reader 22 may be optional or omitted. For example, game content or applications may be accessed over a network via the network I/O 38 rendering the game media reader 22 and/or the game media optional.

The computing system 800 may include a separate graphics processor 24. In some cases, the graphics processor 24 may be built into the processing unit 802, such as with an APU. In some such cases, the graphics processor 24 may share Random Access Memory (RAM) with the processing unit 802. Alternatively, or in addition, the computing system 800 may include a discrete graphics processor 24 that is separate from the processing unit 802. In some such cases, the graphics processor 24 may have separate RAM from the processing unit 802. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The computing system 800 also includes various components for enabling input/output, such as an I/O 32, a user interface I/O 34, a display I/O 36, and a network I/O 38. As previously described, the input/output components may, in some cases, including touch-enabled devices. The I/O 32 interacts with storage element 303 and, through a device 42, removable storage media 44 in order to provide storage for the computing system 800. The storage element 303 can store a database that includes the failure signatures, clusters, families, and groups of families. Processing unit 802 can communicate through I/O 32 to store data, such as game state data and any shared data files. In addition to storage 803 and removable storage media 44, the computing system 800 is also shown including ROM (Read-Only Memory) 46 and RAM 48. RAM 48 may be used for data that is accessed frequently, such as when a game is being played, or for all data that is accessed by the processing unit 802 and/or the graphics processor 24.

User I/O 34 is used to send and receive commands between processing unit 802 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing system 800 on a display device, such as graphics, user interfaces, video, and/or other visual content. The computing system 800 may comprise one or more integrated displays configured to receive display output signals produced by the display I/O 36, which may be output for display to a user. According to some embodiments, display output signals produced by the display I/O 36 may also be output to one or more display devices external to the computing system 800.

The computing system 800 can also include other features that may be used with a game, such as a clock 50, flash memory 52, and other components. An audio/video player 56 might also be used to play a video sequence, such as a movie. It should be understood that other components may be provided in the computing system 800 and that a person skilled in the art will appreciate other variations of the computing system 800.

Program code can be stored in ROM 46, RAM 48, or storage 803 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 803, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing system 800 is turned off or loses power.

As computing system 800 reads game media 12 and provides a game, information may be read from game media 12 and stored in a memory device, such as RAM 48. Additionally, data from storage 803, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 802 or distributed among several media, such as game media 12 and storage 803.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
obtaining a three-dimensional face model of a face of a virtual character, the three-dimensional face model having a neutral expression unique to the three-dimensional face model;
presenting, in a user interface, the three-dimensional face model, wherein facial characteristics of the three-dimensional face model are adjustable in the user interface;
obtaining definitions of one or more facial shapes of the virtual character, each of the one or more facial shapes being associated with one or more facial shape identifiers, wherein a facial shape identifier indicates adjustment of one or more facial characteristics, wherein a facial shape represents the three-dimensional face model of the virtual character with facial characteristics adjusted according to the one or more associated facial shape identifiers,
wherein for each facial shape corresponding to a respective facial shape identifier represents adjustments to facial characteristics of the three-dimensional face model relative to the same neutral expression unique to the three-dimensional face model,
and wherein the definitions of the facial shapes indicate respective ranges of movement associated with the one or more facial characteristics;
storing, in a database, the definitions of the one or more facial shapes of the virtual character;
receiving user input specifying a plurality of facial shape identifiers via the user interface, the user input further specifying an intensity associated with a particular facial shape identifier of the specified plurality of facial shape identifiers, the specified intensity informing an extent to which a facial characteristic is moved within an indicated range of movement,
the user interface being configured to present the face model with a particular facial expression, wherein the plurality of facial shape identifiers are a complex combination, such that adjusting facial characteristics according to the plurality of facial shape identifiers results in an incorrect representation of the particular facial expression;
obtaining one or more corrective shapes for merging with the plurality of facial shape identifiers, the one or more corrective shapes enabling a correct representation of the particular facial expression; and
rendering the three-dimensional face model with facial characteristics adjusted according to the user input.

2. The method of claim 1, wherein obtaining a three-dimensional face model comprises:
obtaining images, captured via a camera, of a person, wherein each image is associated with one or more facial shape identifiers; and
generating the three-dimensional face model based on images of the person's face, the three-dimensional face model representing the neutral expression of the person.

3. The method of claim 2, wherein obtaining definitions of the one or more facial shapes comprises:
presenting, in the user interface, images associated with a particular facial shape;
receiving adjustment, via the user interface, of facial characteristics of the three-dimensional face model from the neutral expression to the particular facial shape; and
storing the adjustments as the definition of the particular facial shape.

4. The method of claim 1, wherein obtaining definitions of a facial shape comprises:
analyzing a morphology three-dimensional face model, and identifying a closest three-dimensional face model with previously defined facial shapes; and
generating facial shapes for the three-dimensional face model based on the previously defined facial shapes.

5. The method of claim 1, wherein each facial shape identifier corresponds to a respective Action Unit in the Facial Action Coding System.

6. The method of claim 1, wherein combinations of facial shape identifiers are associated with respective facial expressions, and wherein three-dimensional face models of a plurality of virtual characters can be adjusted to present same facial expressions based on combinations of same facial shape identifiers.

7. The method of claim 1, wherein rendering the three-dimensional face model with facial characteristics adjusted according to the plurality of facial shape identifiers comprises:
obtaining facial shapes associated with the facial shape identifiers;
generating the complex combination of the obtained facial shapes and the one or more corrective shapes; and
outputting the three-dimensional face model adjusted to represent the particular facial expression associated with the combination of facial shapes.

8. The method of claim 1, wherein for a different facial expression, a combination of facial shape identifiers is additive, indicating that facial shapes associated with the combined facial shape identifiers are merged to generate the different facial expression.

9. The method of claim 1, wherein a corrective shape is associated with two or more facial shape identifiers, and wherein a combination of the two or more facial shape identifiers conflict.

10. Non-transitory computer storage media storing instructions that when executed by a system of one or more computers, cause the one or more computers to perform operations comprising:
obtaining a three-dimensional face model of a face of a virtual character, the three-dimensional face model having a neutral expression unique to the three-dimensional face model;
presenting, in a user interface, the three-dimensional face model, wherein facial characteristics of the three-dimensional face model are adjustable in the user interface;
obtaining definitions of one or more facial shapes of the virtual character, each of the one or more facial shapes being associated with one or more facial shape identifiers, wherein a facial shape identifier indicates a type of adjustment of one or more facial characteristics, wherein a facial shape represents the three-dimensional face model of the virtual character with facial characteristics adjusted according to the one or more associated facial shape identifiers,
wherein for each facial shape corresponding to a respective facial shape identifier represents adjustments to facial characteristics of the three-dimensional face model relative to the same neutral expression unique to the three-dimensional face model,
and wherein the definitions of the facial shapes indicate respective ranges of movement associated with the one or more facial characteristics;
storing, in a database, the definitions of the one or more facial shapes of the virtual character;
receiving user input specifying a plurality of facial shape identifiers via the user interface, the user input further specifying an intensity associated with a particular facial shape identifier of the specified plurality of facial shape identifiers, the specified intensity informing an extent to which a facial characteristic is moved within an indicated range of movement,
the user interface being configured to present the face model with a particular facial expression, wherein the plurality of facial shape identifiers are a complex combination, such that adjusting facial characteristics according to the plurality of facial shape identifiers results in an incorrect representation of the particular facial expression;
obtaining one or more corrective shapes for merging with the plurality of facial shape identifiers, the one or more corrective shapes enabling a correct representation of the particular facial expression; and
rendering the three-dimensional face model with facial characteristics adjusted according to the user input.

11. The computer storage media of claim 10, wherein obtaining a three-dimensional face model comprises:
obtaining images, captured via a camera, of a person, wherein each image is associated with one or more facial shape identifiers; and
generating the three-dimensional face model based on images of the person's face, the three-dimensional face model representing the neutral expression of the person.

12. The computer storage media of claim 11, wherein obtaining definitions of the one or more facial shapes comprises:
presenting, in the user interface, images associated with a particular facial shape;
receiving adjustment, via the user interface, of facial characteristics of the three-dimensional face model from the neutral expression to the particular facial shape; and
storing the adjustments as the definition of the particular facial shape.

13. The computer storage media of claim 10, wherein obtaining definitions of a facial shape comprises:
analyzing a morphology three-dimensional face model, and identifying a closest three-dimensional face model with previously defined facial shapes; and
generating facial shapes for the three-dimensional face model based on the previously defined facial shapes.

14. The computer storage media of claim 10, wherein each facial shape identifier corresponds to a respective Action Unit in the Facial Action Coding System.

15. The computer storage media of claim 10, wherein combinations of facial shape identifiers are associated with respective facial expressions, and wherein face models of a plurality of virtual characters can be adjusted to present same facial expressions based on combinations of same facial shape identifiers.

16. The computer storage media of claim 10, wherein rendering the three-dimensional face model with facial characteristics adjusted according to the plurality of facial shape identifiers comprises:
obtaining facial shapes associated with the facial shape identifiers;
generating the complex combination of the obtained facial shapes and the one or more corrective shapes; and
outputting the three-dimensional face model adjusted to represent the particular facial expression associated with the combination of facial shapes.

17. The computer storage media of claim 10, wherein for a different facial expression, a combination of facial shape identifiers is additive, indicating that facial shapes associated with the combined facial shape identifiers are merged to generate the facial expression.

18. A system comprising one or more computers and computer storage media storing instructions that when executed by the one or more computers, cause the one or more computers to perform operations comprising:
obtaining a three-dimensional face model of a face of a virtual character, the three-dimensional face model having a neutral expression unique to the three-dimensional face model;
presenting, in a user interface, the three-dimensional face model, wherein facial characteristics of the three-dimensional face model are adjustable in the user interface;
obtaining definitions of one or more facial shapes of the virtual character, each of the one or more facial shapes being associated with one or more facial shape identifiers, wherein a facial shape identifier indicates a type of adjustment of one or more facial characteristics, wherein a facial shape represents the three-dimensional face model of the virtual character with facial characteristics adjusted according to the one or more associated facial shape identifiers,
wherein for each facial shape corresponding to a respective facial shape identifier represents adjustments to facial characteristics of the three-dimensional face model relative to the same neutral expression unique to the three-dimensional face model;

storing, in a database, the definitions of the one or more facial shapes of the virtual character receiving user input specifying a plurality of facial shape identifiers via the user interface, the user input further specifying an intensity associated with a particular facial shape identifier of the specified plurality of facial shape identifiers, the specified intensity informing an extent to which a facial characteristic is moved within an indicated range of movement, the user interface configured to present the face model with a particular facial expression, wherein the plurality of facial shape identifiers are a complex combination, such that adjusting facial characteristics according to the plurality of facial shape identifiers results in an incorrect representation of the particular facial expression;

obtaining one or more corrective shapes for merging with the plurality of facial shape identifiers, the one or more corrective shapes enabling a correct representation of the particular facial expression; and rendering the three-dimensional face model with facial characteristics adjusted according to the user input.

19. The system of claim 18, wherein each facial shape identifier corresponds to a respective Action Unit in the Facial Action Coding System.

20. The system of claim 18, wherein for a different facial expression, a combination of facial shapes identifiers is additive, indicating that facial shapes associated with the combined facial shape identifiers are merged to generate the different facial expression.

* * * * *